United States Patent
Fukuda et al.

(10) Patent No.: US 8,343,628 B2
(45) Date of Patent: Jan. 1, 2013

(54) HARD COAT FILM, POLARIZING PLATE, AND IMAGE DISPLAY

(75) Inventors: Kenichi Fukuda, Minami-Ashigara (JP); Hiroyuki Yoneyama, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 830 days.

(21) Appl. No.: 12/392,528

(22) Filed: Feb. 25, 2009

(65) Prior Publication Data

US 2009/0214871 A1  Aug. 27, 2009

(30) Foreign Application Priority Data

Feb. 26, 2008  (JP) .............................. P2008-044789

(51) Int. Cl.
- *B32B 27/32* (2006.01)
- *B32B 9/04* (2006.01)
- *B32B 27/38* (2006.01)
- *B32B 27/00* (2006.01)
- *G02B 27/28* (2006.01)

(52) U.S. Cl. ..................... 428/411.1; 428/220; 428/332; 428/413; 428/500; 428/521; 359/485.01

(58) Field of Classification Search ........................ None
See application file for complete search history.

(56) References Cited

U.S. PATENT DOCUMENTS

| | | | |
|---|---|---|---|
| 7,847,049 B2 * | 12/2010 | Ito et al. | 527/300 |
| 2003/0138398 A1 | 7/2003 | Okumura et al. | |
| 2009/0042034 A1 * | 2/2009 | Ito et al. | 428/413 |

FOREIGN PATENT DOCUMENTS

| | | |
|---|---|---|
| JP | 2810264 B2 | 10/1998 |
| JP | 3475252 B2 | 12/2003 |
| JP | 2007-99989 A | 4/2007 |

* cited by examiner

*Primary Examiner* — Sheeba Ahmed

(74) *Attorney, Agent, or Firm* — Birch Stewart Kolasch & Birch, LLP

(57) ABSTRACT

A hard coat film includes a transparent plastic film substrate; and a hard coat layer, wherein the hard coat layer is formed of a composition for forming a hard coat layer, the composition containing the following component (A), component (B), and an organic solvent:

Component (A): a polyrotaxane,

Component (B): a monomer having two or more ethylenically unsaturated groups.

10 Claims, No Drawings

HARD COAT FILM, POLARIZING PLATE, AND IMAGE DISPLAY

BACKGROUND OF THE INVENTION

1. Field of the Invention

The present invention relates to a hard coat layer comprising a transparent plastic film having thereon a curable layer formed of a curable composition containing polyfunctional acrylate and polyrotaxane. More specifically the invention relates to a hard coat film high in surface hardness having such a hard coat layer having a thickness of 10 μm or more, an antireflection hard coat film having the hard coat film as the substrate, and a polarizing plate and an image display using the antireflection hard coat film.

2. Description of the Related Art

Antireflection films comprising a transparent plastic film substrate having thereon an antiglare hard coat layer (what is also called an antiglare film) and a hard coat layer and a low reflectance layer by lamination are arranged on the surfaces of various displays such as a liquid crystal display (LCD), a plasma display panel (PDP), an electroluminescence display (ELD), and a cathode ray tube (CRT) for the prevention of contrast reduction by reflection of outer light and mirroring of images due to surface scattering and low surface reflection.

In recent years, image displays mounting an antireflection film have been spread along with the price reduction of liquid crystal televisions. With such tendency, the cases where the mounted antireflection films are exposed to various environments with the image displays have increased. In particular, such cases have increased where antireflection films are handled like braun tube televisions having a glass surface, and the possibility that the surfaces of liquid crystal displays are scratched is increased. Accordingly, the antireflection film used as the outermost surface of a liquid crystal display is required to have high physical strength (scratch resistance and the like) in addition to high improving effect of visibility that has so far been required.

In recent years, a novel kind of gel by a new technique not being classified to any of physical gel and chemical gel, that is, "gyrate gel or topological gel", is proposed, and polyrotaxane is used in such gyrate gel. Polyrotaxane is a conceptual compound comprising cyclic compounds and a straight chain polymer penetrating a plurality of these cyclic compounds, and having a structure of capping both terminals of the straight chain polymer.

For example, Japanese Patent No. 2810264 discloses polyrotaxane using α-cyclodextrin as the cyclic compound and polyethylene glycol as the straight chain polymer.

Japanese Patent No. 3475252 discloses crosslinked polyrotaxane that is applicable to gyrate gel by crosslinking of a plurality of polyrotaxanes. Since the crosslinked polyrotaxane is such that cyclic molecules penetrated by straight chain molecule are capable of moving along the straight chain (a pulley effect), the crosslinked polyrotaxane has viscoelasticity, and even when tensile force is applied, the tensile force can be evenly dispersed by the pulley effect. Accordingly, the crosslinked polyrotaxane has excellent characteristics such that cracks and scratches are hardly caused unlike conventional crosslinked polymers.

The researches of applications of these polyrotaxane and crosslinked polyrotaxane to various fields have been progressed, but the application of these polyrotaxanes to the hard coat layer of the hard coat film for a liquid crystal display has not been advanced.

In connection with the application of polyrotaxane to coatings, JP-A-2007-099989 (The term "JP-A" as used herein refers to an "unexamined published Japanese patent application".) discloses a coating containing polyrotaxane for automobiles. However, since the support of a hard coat film for a liquid crystal display is a plastic film having flexibility, problems such as curling and brittleness are important. Contrary to this, the support of automobiles is a steel plate having rigidity, so that the improvements of curling and brittleness have not been suggested at all.

SUMMARY OF THE INVENTION

An object of the invention is to provide a hard coat film improved in deterioration of brittleness of the hard coat layer, and curling and brittleness of the hard coat film when laminated while maintaining high surface hardness by the introduction of polyrotaxane to the hard coat layer. Another object is to provide an antireflection film using the hard coat film as the substrate. A further object is to provide a polarizing plate and an image display equipped with the antireflection film.

The present inventor has found that a hard coat film having high surface hardness and free from the problems such as deterioration of brittleness and curling can be obtained by providing a hard coat layer formed of a curable composition containing polyfunctional acrylate and polyrotaxane on a transparent plastic film.

It has also been found that an antireflective hard coat film excellent in an antireflection property can be manufactured by lamination of an antireflection layer with the hard coat film as the substrate.

That is, the inventor has achieved the above objects by the following constitutions.

(1) A hard coat film comprising:
 a transparent plastic film substrate; and
 a hard coat layer,
 wherein the hard coat layer is formed of a composition for forming a hard coat layer, the composition containing the following component (A), component (B), and an organic solvent:
Component (A): a polyrotaxane,
Component (B): a monomer having two or more ethylenically unsaturated groups.

(2) The hard coat film as claimed in (1), wherein
 a cyclic molecule of the polyrotaxane of component (A) is a modified or unmodified cyclodextrin.

(3) The hard coat film as claimed in (2), wherein
 the cyclic molecule of the polyrotaxane of component (A) is a cyclodextrin in which a hydroxyl group thereof is modified with a hydrophobic modifying group, and the degree of the modification by the hydrophobic modifying group is 0.02 or more when taking the maximum number of hydroxyl groups of the cyclodextrin which can be modified as 1.

(4) The hard coat film as described in any one of (1) to (3), wherein the polyrotaxane of component (A) is a polyrotaxane having an unsaturated double bond group.

(5) The hard coat film as described in any one of (1) to (4), wherein a straight chain molecule of the polyrotaxane of component (A) has a polyethylene glycol chain.

(6) The hard coat film as described in any one of (1) to (5), wherein at least a part of component (B) is a polyfunctional acrylate modified with ethylene oxide.

(7) The hard coat film as described in any one of (1) to (6), further comprising:
 a second hard coat layer formed of a composition not containing polyrotaxane, the second hard coat layer being provided between the hard coat layer and the transparent plastic film.

(8) The hard coat film as described in any one of (1) to (7), further comprising:
a low refractive index layer, which is formed on the hard coat layer directly or via another layer.
(9) The hard coat film as described in any of (1) to (7), wherein the transparent substrate film is a transparent plastic film substrate containing cellulose acylate as the main component.
(10) A polarizing plate comprising:
the hard coat layer described in any one of (1) to (9) as a protective film of the polarizing plate.
(11) An image display comprising:
the hard coat film described in any one of (1) to (9) or the polarizing plate described in (10).

DETAILED DESCRIPTION OF THE INVENTION

A method for manufacturing the optical film of the invention will be described below, but the invention is by no means restricted to the following description.

Incidentally, in the specification of the invention, when numerical values represent physical values and characteristic values, the description "from (numerical value 1) to (numerical value 2)" means "numerical value 1 or more and numerical value 2 or less".

"Resin" means to include a monomer, an oligomer and a prepolymer.

"(Meth)acrylate" means methacrylate and acrylate.

The hard coat layer in the invention is a hard coat layer formed of a composition for forming a hard coat layer containing the following component (A), component (B), and an organic solvent. By introduction of component (A) into the hard coat layer, flexibility can be introduced with maintaining hardness, and the problem of curling attributable to shrinkage by hardening can also be improved.
Component (A): polyrotaxane
Component (B): a monomer having two or more ethylenically unsaturated groups It has been found by the present inventor that a hard coat film formed by lamination of a hard coat layer formed by introduction of polyrotaxane of component (A) can greatly improve brittleness and curling as compared with conventional hard coat films not containing polyrotaxane, thus the invention has been completed.
Transparent Plastic Film Substrate:

The hard coat film in the invention is manufactured by forming a hard coat layer on a transparent plastic film substrate (hereinafter also referred to as "a transparent support"). The light transmittance of a transparent plastic film substrate is preferably 80% or more, and more preferably 86% or more. The haze of a transparent plastic film substrate is preferably 2.0% or less, and more preferably 1.0% or less.

The examples of the materials of the transparent plastic film include cellulose ester, polyamide, polycarbonate, polyester (e.g., polyethylene terephthalate, polyethylene naphthalate, poly-1,4-cyclohexanedimethylene terephthalate, polyethylene-1,2-diphenoxyethane-4,4'-dicarboxylate, polybutylene terephthalate, etc.), polystyrene (e.g., syndiotactic polystyrene), polyolefin (e.g., polypropylene, polyethylene, polymethylpentene, etc.), polysulfone, polyether sulfone, polyallylate, polyether imide, polymethyl methacrylate, and polyether ketone. Of these materials, cellulose ester, polycarbonate, polyethylene terephthalate and polyethylene naphthalate are preferred.

In particular, when the hard coat film of the invention is used in a liquid crystal display (by lamination of an antireflection layer), a cellulose acylate film is preferably used.

Plastic films are generally low in a hygroscopic property and hardly absorb moisture even when preserved in highly humid environments, while cellulose acylate films used as the protective film of a polarizing plate are highly hygroscopic and absorb moisture to swell when preserved in highly humid conditions.

Contrary to this, a hard coat layer formed of a curable resin is generally low in a hygroscopic property, accordingly in a hard coat film obtained by lamination of a hard coat layer formed of a curable resin on a cellulose acylate film as the substrate, the substrate relatively elongates and curling occurs with the substrate being outside, due to the difference in hygroscopic swelling property between the substrate and the hard coat layer.

Accordingly, the invention is especially effective in the case of using a cellulose acylate film as the substrate.

In the invention, the thickness of the transparent plastic film substrate is preferably from 10 to 500 μm, more preferably from 20 to 300 μm, and especially preferably from 30 to 200 μm. When the substrate thickness is in this range, film strength and flexibility are compatible.
Hard Coat Layer:

The hard coat layer in the invention is formed of a hard coat layer-forming composition containing the following component (A), component (B), and an organic solvent:
Component (A): polyrotaxane,
Component (B): a monomer having two or more ethylenically unsaturated groups.

If necessary, the hard coat layer-forming composition may contain binders other than component (B), matting particles to give an antiglare property or an inside scattering property, and inorganic fine particles for heightening refractive index, prevention of shrinkage due to crosslinking, and strengthening.

The thickness of the hard coat layer in the invention is preferably from 1 to 60 μm, more preferably from 5 to 40 μm, and especially preferably from 10 to 30 μm. By thickening the hard coat layer thickness, surface hardness against indentation that can be evaluated by the pencil hardness test can be secured. On the other hand, by restraining the least upper bound of the film thickness to the above range, deterioration of curling and brittleness can be inhibited.

In particular, the hard coat layer of the invention can be improved in curling and brittleness by containing polyrotaxane as compared with conventional hard coat layers. Accordingly, the film thickness is preferably thicker, and specifically from 10 to 30 μm is preferred.

The hard coat layer in the invention may consist of a plurality of layers of two or more layers. In such a case, it is preferred that any one layer alone of the plurality of layers is a hard coat layer formed of a hard coat layer-forming composition containing component (A), component (B) and an organic solvent, i.e., a hard coat layer containing polyrotaxane. It is more preferred that the hard coat layer containing polyrotaxane of the plurality of hard coat layers is a layer on the farthest side from the substrate in view of capable of obtaining greater improving effect of curling and brittleness.

In this case, all the thicknesses of the hard coat layers are from 1 to 59 μm. The total thickness of the hard coat layers is preferably from 1 to 60 μm as described above, more preferably from 5 to 40 μm, and particularly preferably from 10 to 30 μm.
Polyrotaxane:

Polyrotaxane of essential component (A) in the invention will be described below.

The apertures of the cyclic molecules of polyrotaxane are penetrated by a straight chain molecule like skewering, and blocking groups are arranged at both terminals (both terminals of the straight chain molecule) of pseudo polyrotaxane comprising a plurality of cyclic molecules clathrating the straight chain molecule so that the cyclic molecules are not freed.

Straight Chain Molecule:

The straight chain molecule contained in the compound of the invention is a molecule or a material clathrated by cyclic molecules and capable of being united with the cyclic molecules by bonding not like covalently, and the straight chain molecule is not especially restricted so long as it is a straight chain molecule. Incidentally, in the invention, "a straight chain molecule" means molecules including polymers and all other materials satisfying the above requisites.

Further, "straight chain" of "straight chain molecule" in the invention means to be substantially "straight chain". That is, if the cyclic molecules of rotators are capable of rotation, or the cyclic molecules are capable of sliding or moving on the straight chain molecule, the straight chain molecule may have a branched chain. Further, the length of "straight chain" is not especially restricted so long as the cyclic molecules are capable of sliding or moving on the straight chain molecule.

As the straight chain molecules of the invention, hydrophilic polymers, e.g., polyvinyl alcohol, polyvinyl pyrrolidone, poly(meth)acrylic acid, cellulose-based resins (carboxymethyl cellulose, hydroxyethyl cellulose, hydroxypropyl cellulose, etc.), polyacrylamide, polyethylene oxide, polyethylene glycol, polyvinyl acetal-based resins, polyvinyl methyl ether, polyamine, polyethyleneimine, casein, gelatin, starch, etc., and/or copolymers of these hydrophilic polymers; hydrophobic polymers, e.g., polyethylene, polypropylene, polyolefin-based resins such as copolymer resins with other olefin-based monomers, polyester resins, polyvinyl chloride resins, polystyrene-based resins such as polystyrene, and acrylonitrile-styrene copolymer resins, polymethyl methacrylate, (meth)acrylic ester copolymers, acrylic resins such as acrylonitrile-methyl acrylate copolymer resins, polycarbonate resins, polyurethane resins, vinyl chloride-vinyl acetate copolymer resins, polyvinyl butyral resins, etc.; and derivatives and modified products of these compounds can be exemplified.

Of these straight chain molecules, hydrophilic polymers are preferably used. Hydrophilic polymers give a hygroscopic property to hard coat layers and, especially when the substrate is a cellulose acylate film, curling attributable to the difference in a hygroscopic swelling property between the hard coat layer and the substrate film can be reduced.

Of the hydrophilic polymers, polyethylene glycol, polypropylene glycol, copolymers of polyethylene glycol and polypropylene glycol, polyisoprene, polyisobutylene, polybutadiene, polytetrahydrofuran, polydimethylsiloxane, polyethylene, and polypropylene are preferred, polyethylene glycol, polypropylene glycol, and copolymers of polyethylene glycol and polypropylene glycol are more preferred, and polyethylene glycol is especially preferred.

It is preferred that the straight chain molecule of the invention in itself has high breaking strength. The breaking strength of a hard coat film layer also depends upon other factors such as the bonding strength of blocking groups and the straight chain molecule, the bonding strength of cyclic molecules and the binder of a hard coat layer, and the bonding strength of the cyclic molecules to each other, but when the straight chain molecule of the invention in itself has high breaking strength, higher breaking strength can be provided.

The molecular weight of the straight chain molecule in the invention is 1,000 or more, for example, from 1,000 to 1,000,000, preferably 5,000 or more, for example, from 5,000 to 1,000,000 or from 5,000 to 500,000, and more preferably 10,000 or more, for example, from 10,000 to 1,000,000, from 10,000 to 500,000 or from 10,000 to 300,000.

Further, the straight chain molecule in the invention is preferably a biodegradable molecule in the point of "gentle to environment".

It is preferred for the straight chain molecule in the invention to have reacting groups at both terminals. By the presence of the reacting groups, reaction with blocking groups becomes easy. The reacting groups depend upon the blocking groups to be used, and, for example, a hydroxyl group, an amino group, a carboxyl group, and a thiol group can be exemplified as the reacting groups.

Cyclic Molecule:

Any and every cyclic molecule can be used as the cyclic molecules in the invention so long as the cyclic molecule is capable of clathrating the straight chain molecule.

Incidentally, "cyclic molecules" in the invention mean various cyclic materials including cyclic molecules. Further, "cyclic molecules" in the invention mean molecules and materials substantially cyclic. "Substantially cyclic" means to include those not completely closed such as an alphabetical "C", that is, cyclic molecules having an overlapped helical structure whose one end and the other end are not bonded are also included. Further, the rings of "bicyclic molecules" described later can also be defined similarly to "substantially cyclic" of "cyclic molecules". That is, one ring or both rings of "bicyclic molecules" may be a ring not completely closed such as an alphabetical "C", and may have an overlapped helical structure whose one end and the other end are not bonded.

As the cyclic molecules in the invention, for example, various kinds of cyclodextrins (e.g., α-cyclodextrin, β-cyclodextrin, γ-cyclodextrin, dimethylcyclodextrin, glycosylcyclodextrin and derivatives and modified products thereof), crown ethers, benzocrown ethers, dibenzocrowns, dicyclohexanocrowns, and derivatives and modified products thereof can be exemplified.

These cyclodextrins and crown ethers are different in the sizes of apertures of cyclic molecules according to the kinds. Accordingly, cyclic molecules to be used can be selected by the kind of straight chain molecule. Specifically, taking the straight chain molecule to be used as cylindrical, cyclic molecules can be selected according to the diameter of the cross section of the cylinder, the hydrophobic property or hydrophilic property of the straight chain molecule. Further, when cyclic molecules having relatively large aperture and a cylindrical straight chain molecule having a relatively small diameter are used, the apertures of the cyclic molecules can clathrate two or more straight chain molecules. Of the above cyclic molecules, cyclodextrins are preferred in the point of having biodegradability and "gentle to environment".

It is preferred in the invention to use α-cyclodextrin as the cyclic molecule.

The number of the cyclic molecules to clathrate a straight chain molecule (the amount of clathration) is, when the cyclic molecules are cyclodextrins, taking the maximum clathration amount as 1, preferably from 0.05 to 0.60, more preferably from 0.10 to 0.50, and still more preferably from 0.20 to 0.40. When the clathration amount is less than 0.05, there are cases where a pulley effect is not revealed, while when the amount exceeds 0.60, cyclodextrins of the cyclic molecule are arranged too densely and the mobility of cyclodextrins lowers. Further, there are cases where the insolubility of cyclodextrins themselves in an organic solvent is strengthened and the solubility of the obtained polyrotaxane in an organic solvent also lowers.

It is preferred for the cyclic molecules in the invention to have reactive groups at the outside of the rings. When cyclic molecules are bonded or crosslinked to each other, reaction can be easily carried out by the reactive groups. As the reactive groups, although they depend upon the crosslinking agent and the like to be used, e.g., a hydroxyl group, an amino group, a carboxyl group, a thiol group, and an aldehyde group can be exemplified. In addition, it is preferred to use groups that do not react with the blocking groups in the blocking reaction as the reactive groups.

Blocking Group:

Blocking groups in the invention may be any group so long as it is capable of maintaining the state of penetration of the cyclic molecules by the straight chain molecule. As such groups, groups having "bulkiness" and/or groups having "ionicity" are exemplified. Here, "groups" mean various groups including molecular groups and polymeric groups. Further, for the "ionicity" of groups having "ionicity" and the "ionicity" of cyclic molecules to be influenced to each other, for example, to be repelled to each other, the form of penetration of cyclic molecules by a straight chain molecule can be maintained.

Blocking groups in the invention may be the main chain or side chain of a polymer so long as they can maintain the form of penetration like skewering as described above. When polymer A is used as the blocking group, the form where polymer A is present as matrix and the compound of the invention is contained as a part of it, or contrary to this the form where the compound of the invention is present as matrix and polymer A is contained as a part of it may be used. By the combination of polymer A having various characteristics and the compound of the invention like this, composite materials having the characteristics of the compound of the invention and the characteristics of polymer A in combination can be formed.

Specifically as the blocking groups of the molecular groups, dinitrophenyl groups, e.g., a 2,4-dinitrophenyl group and a 3,5-dinitrophenyl group, cyclodextrins, adamantane groups, trityl groups, fluoresceins, pyrenes, and derivatives and modified products thereof can be exemplified. More specifically, even when α-cyclodextrin as the cyclic molecule and polyethylene glycol as the straight chain molecule are used, cyclodextrins, dinitrophenyl groups, e.g., a 2,4-dinitrophenyl group and a 3,5-dinitrophenyl group, adamantane groups, trityl groups, fluoresceins, pyrenes, and derivatives and modified products thereof can be exemplified.

Modified polyrotaxanes preferably used in the invention are described in the next place. Polyrotaxanes having a plurality of modifications as described below can be preferably used in the invention.

Crosslinked Polyrotaxane:

Crosslinked polyrotaxane is a compound comprising two or more polyrotaxanes in which the cyclic molecules are chemically bonded to each other, which two or more cyclic molecules may be the same or different. At this time, the chemical bond may be a single bond or may be a bond via various atoms or molecules.

Further, a cyclic molecule having a crosslinked cyclic structure, that is, "a bicyclic molecule" having first and second rings can be used. In this case, crosslinked polyrotaxane can be obtained by skewering and clathrating the first and second rings of "a bicyclic molecule" by a straight chain molecule, for example, by the admixture of "a bicyclic molecule" and a straight chain molecule.

Since the cyclic molecules of the crosslinked polyrotaxane penetrated by the straight chain molecule like skewering is capable of moving along the straight chain molecule (a pulley effect), the crosslinked polyrotaxane has viscoelasticity, and even when tensile force is applied, the tensile force can be uniformly dispersed to relax internal stress by the pulley effect.

Hydrophobitization Modified Polyrotaxane:

When the cyclic molecules of polyrotaxane are cyclodextrins such as α-cyclodextrin, hydrophobitization modified polyrotaxane obtained by substituting at least one of the hydroxyl groups of the cyclodextrin with other organic group (a hydrophobic group) is more preferably used in the invention for the reason of capable of improving solubility of the polyrotaxane in the solvent contained in a hard coat film layer-forming composition.

As the examples of hydrophobic groups, e.g., an alkyl group, a benzyl group, a benzene derivative-containing group, an acyl group, a silyl group, a trityl group, a nitric ester group, a tosyl group, an alkyl-substituted ethylenically unsaturated group as the photo-curable site, and an alkyl-substituted epoxy group as the thermosetting site can be exemplified, but the invention is not restricted thereto. In addition, in the above hydrophobitization modified polyrotaxane, the hydrophobic group may be used by one kind alone, or two or more hydrophobic groups may be used in combination.

The degree of modification by the hydrophobic modifying group is, taking the maximum number of the hydroxyl group of the cyclodextrin capable of being modified as 1, preferably 0.02 or more (1 or less), more preferably 0.04 or more, and still more preferably 0.06 or more.

When the degree of modification is less than 0.02, solubility of the polyrotaxane in an organic solvent is not sufficient, and there are cases where insoluble rashes (projecting portions resulting from the adhesion of foreign matters and the like) are formed.

The maximum number of the hydroxyl groups of the cyclodextrin capable of being modified is, in other words, the number of all the hydroxyl groups of the cyclodextrin before modification. The degree of modification is the ratio of the number of modified hydroxyl groups to the number of all the hydroxyl groups.

The hydrophobic modifying group may be at least one, and in this case, it is preferred to have one hydrophobic modifying group per one cyclodextrin ring.

Further, by the introduction of a hydrophobic modifying group having a functional group, it becomes possible to improve reactivity with other polymers. In the next place, polyrotaxane having an unsaturated double bonding group will be described. An unsaturated double bonding group behaves as a hydrophobic modifying group.

Polyrotaxane Having Unsaturated Double Bond:

An unsaturated bonding group can be introduced into the part corresponding to a cyclic molecule. By the introduction of this group, polymerization with a monomer having two or more ethylenically unsaturated groups of Component (B) becomes possible.

The introduction of an unsaturated bonding group can be performed by the substitution of at least a part of a cyclic molecule having a hydroxyl group (—OH) such as dextrin with an unsaturated bonding group, preferably an unsaturated double bonding group.

As the examples of unsaturated bonding groups, for example, unsaturated double bonding groups, olefinyl groups, e.g., an acryl group, a methacryl (methacryloyl) group, a vinyl ether group, and a styryl group can be exemplified, but the invention is not restricted thereto.

An unsaturated bonding group can be introduced according to the following methods. That is, a method by formation of carbamate bonding by an isocyanate compound and the like, a method by formation of ester bonding by a carboxylic acid compound, an acid chloride compound, an acid anhydride and the like, a method by formation of silyl ether bonding by a silane compound and the like, and a method by formation of carbonate bonding by a chlorocarbonic acid compound and the like can be exemplified.

Introduction of a (meth)acryloyl group as an unsaturated double bonding group via a carbamoyl bond is carried out by dissolving polyrotaxane in a dehydrating solvent such as DMSO or DMF, and adding a (meth)acryloylating agent having an isocyanate group. Further, a (meth)acryloylating agent having an active group, e.g., a glycidyl group or an acid chloride, etc., can also be used when a (meth)acryloyl group is introduced via an ether bond or an ester bond.

The process of substitution of a hydroxyl group of cyclic molecules with an unsaturated double bond group may be performed any time before, during or after the process of preparation of pseudo polyrotaxane. Alternatively, the process of substitution may be carried out before, during or after the process of preparation of polyrotaxane by blocking of pseudo polyrotaxane. Further, when the polyrotaxane is crosslinked polyrotaxane, the process of substitution may be provided before, during or after the process of crosslinking of polyrotaxanes to each other. The substitution may be performed at two or more times of these processes. It is preferred that the process of substitution is performed after the process of preparation of polyrotaxane by blocking of pseudo polyrotaxane and before crosslinking of polyrotaxanes to each other. The conditions used in the substitution process depend upon the unsaturated double bond group to be substituted but not especially restricted and various reaction methods and reaction conditions can be used.

The amount of polyrotaxane to be blended is preferably from 1 to 30 weight parts per 100 weight parts of the solids content in the hard coat layer, more preferably from 2 to 25 weight parts, and still more preferably from 3 to 20 weight parts. When polyrotaxane is used in this range, hardness and flexibility can be compatible.

Polyrotaxane for use in the invention is preferably hydrophobitization modified polyrotaxane, more preferably polyrotaxane having an unsaturated double bond, and polyrotaxane uniting both functions, i.e., having both of a hydrophobic modifying group and an unsaturated double bond group is especially preferred.

Monomers Having Two or More Ethylenically Unsaturated Groups:

As the monomer having two or more ethylenically unsaturated groups of component (B) of the invention, esters of polyhydric alcohol and (meth)acrylic acid [e.g., ethylene glycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri(meth)acrylate, trimethyloethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, and polyester polyacrylate], and ethylene oxide modified products, polyethylene oxide modified products, and caprolactone modified products of the above esters, vinylbenzene and derivatives thereof (e.g., 1,4-divinylbenzene, 4-vinylbenzoic acid-2-acryloyl ethyl ester, 1,4-divinylcyclohexanone), vinylsulfone (e.g., divinylsulfone), acrylamide (e.g., methylenebisacrylamide), and methacrylamide are exemplified. These monomers may be used in combination of two or more.

When the straight chain molecule of polyrotaxane of component (A) of the invention is polyalkylene glycol, it is preferred that at least a part of a monomer having two or more ethylenically unsaturated groups of component (B) of the invention is an ethylene oxide modified product or a polyethylene oxide modified product.

In particular when the straight chain molecule of polyrotaxane is polyethylene glycol, it is preferred to contain an ethylene oxide modified product as at least a part of component (B). By containing an ethylene oxide modified product, compatibility with polyrotaxane can be increased and rise of haze of the hard coat layer ascribable to insoluble matters can be restrained.

Polymerization of monomers having these ethylenically unsaturated groups can be carried out by irradiation with ionizing radiation or heating in the presence of a photo-radical polymerization initiator or a thermal radical polymerization initiator.

Accordingly, the hard coat layer can be formed by preparing a coating solution containing a monomer for forming a curable resin such as the above-described ethylenically unsaturated monomer, a photo-radical initiator or a thermal radical initiator, low refractive index fine particles, and if necessary, the later-described inorganic filler other than the low refractive index fine particles, matting particles, and a leveling agent, coating the coating solution on a transparent substrate, and curing by polymerization reaction with ionizing radiation or by heating.

Photo-Radical Polymerization Initiator:

As photo-radical polymerization initiators, acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borate salts, active esters, active halogens, inorganic complexes, and coumarins are exemplified.

The examples of the acetophenones include 2,2-dimethoxyacetophenone, 2,2-diethoxyacetophenone, p-dimethylacetophenone, I-hydroxy dimethyl phenyl ketone, 1-hydroxy dimethyl-p-isopropyl phenyl ketone, 1-hydroxycyclohexyl phenyl ketone, 2-methyl-4-methylthio-2-morpholinopropiophenone, 2-benzyl-2-dimethylamino-1-(4-morpholinophenyl)butanone, 4-phenoxydichloroacetophenone, and 4-t-butyldicycloacetophenone.

The examples of the benzoins include benzoin, benzoin methyl ether, benzoin ethyl ether, benzoin isopropyl ether, benzyldimethylketal, benzoin benzenesulfonate, benzoin toluenesulfonate, benzoin methyl ether, benzoin ethyl ether, and benzoin isopropyl ether.

The examples of the benzophenones include benzophenone, hydroxyl-benzophenone, 4-benzoyl-4'-methyldiphenyl sulfide, 2,4-dichlorobenzophenone, 4,4-dichlorobenzophenone, p-chlorobenzophenone, 4,4'-dimethylaminobenzophenone (Michler's ketone), and 3,3',4,4'-tetra(t-butylperoxycarbonyl)benzophenone.

The example of the phosphine oxides include 2,4,6-trimethylbenzoyldiphenyl phosphine oxide.

The examples of the active esters include 1,2-octanedione, 1-[4-(phenylthio)-2-(O-benzoyloxime)], sulfonic esters, and cyclic active ester compounds.

The examples of the onium salts include aromatic diazonium salts, aromatic iodonium salts, and aromatic sulfonium salts.

The examples of the borate salts include ion complexes with cationic dyestuffs.

As the examples of the active halogens, S-triazine and oxathiazole compounds are known, and 2-(p-methoxyphenyl)-4,6-bis(trichloromethyl)-s-triazine, 2-(p-styrylphenyl)-4,6-bis(trichloromethyl)-s-triazine, 2-(3-Br-4-di(ethyl acetate)amino)phenyl)-4,6-bis(trichloromethyl)-s-triazine, and 2-trihalomethyl-5-(p-methoxyphenyl)-1,3,4-oxadiazole are included.

The examples of the inorganic complexes include (η5-2, 4-cyclopentadiene-1-yl)-bis[2,6-difluoro-3-(1H-pyrrole-1-yl)phenyl] titanium.

The examples of the coumarins include 3-ketocoumarin.

These initiators may be used alone, or may be used as mixture.

Various examples are described in Saishin *UV Koka Gijutsu* (*The Latest UV Curing Techniques*), p. 159, Gijutsu Joho Kyokai (1991), and usefully used in the invention.

As commercially available photo-cleavage type photo-radical polymerization initiators, Irgacure (127, 651, 184, 819, 907, 1870 (CGI-403/Irg 184=7/3 mixed initiators, 500, 369, 1173, 2959, 4265, 4263, etc.), OXE O 1, manufactured by Ciba Japan K.K.), KAYACURE (DETX-S, BP-100, BDMK, CTX, BMS, 2-EAQ, ABQ, CPTX, EPD, ITX, QTX, BTC, and MCA, manufactured by Nippon Kayaku Co., Ltd.), and Esacure (KIP100F, KB1, EB3, BP, X33, KT046, KT37, KIP150, and TZT, manufactured by Sartomer Company, Inc.) are exemplified as preferred examples.

Photo-polymerization initiators are preferably used in the range of from 0.1 to 15 mass parts per 100 mass parts of the polyfunctional monomer, and more preferably in the range of from 1 to 10 mass parts.

Photo-sensitizers may be used in addition to photo-polymerization initiators. As the specific examples of photo-sensitizers, n-butylamine, triethylamine, tri-n-butylphosphine, Michler's ketones and thioxanthone can be exemplified.

Further, one or more auxiliaries such as azide compounds, thiourea compounds and mercapto compounds may be used in combination.

As commercially available photo-sensitizers, KAYA-CURE (DMBI and EPA, manufactured by Nippon Kayaku Co., Ltd.) are exemplified.

Thermal Radical Polymerization Initiator:

As thermal radical initiators, organic or inorganic peroxides, organic azo and diazo compounds can be used.

Specifically, as the organic peroxides, benzoyl peroxide, halogen benzoyl peroxide, lauroyl peroxide, acetyl peroxide, dibutyl peroxide, cumene hydroperoxide, and butyl hydroperoxide, as the inorganic peroxides, hydrogen peroxide, ammonium persulfate, and potassium persulfate, as the azo compounds, 2,2'-azobis(isobutyro-nitrile), 2,2'-azobis(propionitrile), and 1,1'-azobis(cyclohexanecarbonitrile), and as diazo compounds, diazoaminobenzene and p-nitrobenzene diazonium are exemplified.

In addition to the monomer having two or more ethylenically unsaturated groups of component (B), a monomer having a crosslinkable functional group may be used to introduce a crosslinkable functional group into a polymer and introduce a crosslinking structure to the binder polymer by the reaction of the crosslinkable functional group.

The examples of the crosslinkable functional groups include an isocyanate group, an epoxy group, an aziridine group, an oxazoline group, an aldehyde group, a carbonyl group, a hydrazine group, a carboxyl group, a methylol group and an active methylene group. Vinylsulfonic acid, acid anhydride, a cyanoacrylate derivative, melamine, etherified methylol, ester, urethane, and metal alkoxide such as tetramethoxysilane can also be used as monomers to introduce a crosslinking structure. A functional group showing a crosslinking property as a result of decomposition reaction such as a block isocyanate group may also be used. That is, crosslinkable functional groups in the invention may be those exhibiting reactivity not immediately but as a result of decomposition.

A binder polymer having these crosslinkable functional groups can form a crosslinking structure by heating after coating.

Matting Particles:

Matting particles are added, if necessary, to a hard coat layer to give an antiglare property or an inside scattering property. The average particle size of the matting particles is preferably from 1.0 to 15 µm, more preferably from 2.0 to 12 µm, and especially preferably from 3.0 to 10 µm. By making the average particle size 1.0 µm or more, the distribution of scattering angle of light can be restrained in a proper range, by which blurring of characters of the display can be prevented. While when the average particle size is 15 µm or less, the thickness of the hard coat layer can be restrained in a proper range and curling can be prevented.

As the specific examples of the matting particles, inorganic compound particles, e.g., silica particles and $TiO_2$ particles, and resin particles, e.g., crosslinked acryl particles, crosslinked acryl-styrene particles, crosslinked styrene particles, melamine resin particles, and benzoguanamine resin particles can be preferably exemplified. Of these particles, crosslinked acryl particles, crosslinked acryl-styrene particles, and crosslinked styrene particles are especially preferred. The shape of matting particles may be spherical or amorphous. Two or more different kinds of matting particles may be used in combination. It is preferred for the matting particles to be contained in an amount of preferably from 10 to 1,000 $mg/m^2$ in the antiglare hard coat layer to be formed, and more preferably from 30 to 100 $mg/m^2$. An especially preferred embodiment is that crosslinked styrene particles are used as the matting particles, and crosslinked styrene particles having a particle size of half or more the hard coat layer thickness account for 40 to 100% of the crosslinked styrene particles as a whole. The particle size distribution of matting particles is measured by a Coulter counter method, and the measured distribution is converted to particle number distribution.

In the invention, polyrotaxane can also be introduced as resin particles. The improving effects of an inside scattering property and brittleness can be given at the same time. By the introduction as resin particles, the concentration of polyrotaxane can be heightened locally and the improving effects of brittleness can be increased. The ratio of blending amount of polyrotaxane to resin particles is preferably from 1 to 80 wt %, more preferably from 5 to 60 wt %, and still more preferably from 10 to 40 wt %.

When the blending ratio is greater than 80 wt %, the composition is too soft when introduced into the hard coat layer, and the hard coat layer deforms and the scattering property is difficult to control. On the other hand, when the blending ratio is too small, the improving effect of brittleness cannot be obtained.

Inorganic Oxide Fine Particles:

Subsequently, inorganic oxide fine particles that can be used in the invention will be explained.

From the point of colorless of the cured film of curable composition to be obtained, the inorganic oxide particles are preferably oxide particles of at least one element selected from the group consisting of silicon, aluminum, zirconium, titanium, zinc, germanium, indium, tin, antimony and cerium.

These inorganic fine particles are introduced for the purpose of increasing refractive index of the hard coat layer, preventing shrinkage due to crosslinking, and raising strength. It is preferred that inorganic fine particles are uniformly dispersed in the thickness direction in the cured film.

As the inorganic oxide fine particles, the particles of, e.g., silica, alumina, zirconia, titanium oxide, zinc oxide, germanium oxide, indium oxide, tin oxide, indium-tin oxide (ITO), antimony oxide, and cerium oxide can be exemplified. Of these particles, the particles of silica, alumina, zirconia and antimony oxide are preferred in view of high hardness. These particles can be used by one kind alone, or two or more in combination. Further, inorganic oxide particles are preferably used as organic solvent dispersion. When they are used as organic solvent dispersion, the dispersion medium is preferably an organic solvent from the point of compatibility with other components and dispersibility. As such organic solvents, alcohols, e.g., methanol, ethanol, isopropanol, butanol, octanol, etc.; ketones, e.g., acetone, methyl ethyl ketone, methyl isobutyl ketone, cyclohexanone, etc.; esters, e.g., ethyl acetate, butyl acetate, ethyl lactate, γ-butyrolactone, propylene glycol monomethyl ether acetate, propylene glycol monoethyl ether acetate, etc.; ethers, e.g., ethylene glycol monomethyl ether, diethylene glycol monobutyl ether, etc.; aromatic hydrocarbons, e.g., benzene, toluene, xylene, etc.; and amides, e.g., dimethylformamide, dimethylacetamide, N-methylpyrrolidone, etc., can be exemplified. Of these organic solvents, methanol, isopropanol, butanol, methyl ethyl ketone, methyl isobutyl ketone, ethyl acetate, butyl acetate, toluene and xylene are preferred.

The number average particle size of oxide particles is preferably from 1 to 2,000 nm, more preferably from 3 to 200 nm, and especially preferably from 5 to 100 nm. When the number average particle size exceeds 2,000 nm, transparency lowers when cured, and the surface state is liable to deteriorate as a film. Further, for the improvement of dispersibility of particles, various surfactants and amines may be added.

As commercially available products of silicon oxide particle dispersion (e.g., silica particles), e.g., as colloidal silica, methanol silica sol, MA-ST-MS, IPA-ST, IPA-ST-MS, IPA-ST-L, IPA-ST-ZL, IPA-ST-UP, EG-ST, NPC-ST-30, MEK-ST, MEK-ST-L, MIBK-ST, NBA-ST, XBA-ST, DMAC-ST, ST-UP, ST-OUP, ST-20, ST-40, ST-C, ST-N, ST-O, ST-50, ST-OL, etc. (manufactured by Nissan Chemical Industries, Ltd.), and hollow silica CS60-IPA, etc. (manufactured by Catalysts & Chemicals Ind. Co., Ltd.) can be exemplified. As powder silica, Aerosil 130, Aerosil 300, Aerosil 380, Aerosil TT600, Aerosil OX50 (manufactured by Nippon Aerosil Co., Ltd.), Sildex H31, H32, H51, H52, H121, and H122 (manufactured by Asahi Glass Co., Ltd.), E220A and E220 (manufactured by Nippon Silica Co., Ltd.), SYLYSIA470 (manufactured by Fuji Silisia Co., Ltd.), and SG Flake, etc. (manufactured by Nippon Sheet Glass Co., Ltd.) can be exemplified.

As the aqueous dispersions of alumina, Alumina Sol-100, -200 and -520 (manufactured by Nissan Chemical Industries, Ltd.), as the isopropanol dispersion of alumina, AS-150I (manufactured by Sumitomo Osaka Cement Co., Ltd.), as the toluene dispersion of alumina, AS-150T (manufactured by Sumitomo Osaka Cement Co., Ltd.), as the toluene dispersion of zirconia, HXU-110JC (manufactured by Sumitomo Osaka Cement Co., Ltd.), as the aqueous dispersion of zinc antimonite powder, CELNAX (manufactured by Nissan Chemical Industries, Ltd.), as the powders and solvent dispersions of alumina, titanium oxide, tin oxide, indium oxide, zinc oxides, etc., NANOTEC (manufactured by C.I. KASEI CO., LTD.), as aqueous dispersion of antimony doped tin oxide, SN-100D (manufactured by Ishihara Sangyo Kaisha, Ltd.), as ITO powders, products manufactured by Mitsubishi Materials Corporation, and as the aqueous dispersion of cerium oxide, Needral (manufactured by TAKI CHEMICAL CO., LTD.) can be exemplified.

The shapes of oxide particles are spherical, hollow, porous, rod-like, tabular, fibrous, or amorphous, and preferably spherical. The specific surface area of oxide particles (according to a BET specific surface area measuring method using nitrogen) is preferably from 10 to 1,000 $m^2/g$, more preferably from 20 to 500 $m^2/g$, and most preferably from 50 to 300 $m^2/g$. These inorganic oxide particles can be dispersed in an organic solvent in the form of dried powder, but dispersions of oxide fine particles known in the industry as solvent dispersion sols of the above oxides can be directly used.

Dispersing Method:

For preparing dispersions of inorganic oxide fine particles in a solvent from powders in the invention, it is possible to use a dispersant. Dispersants having an anionic group are preferably used in the invention.

As the anionic groups, a group having an acid proton, such as a carboxyl group, a sulfonic acid group (sulfo), a phosphoric acid group (phosphono), and a sulfonamide group, and salts thereof are effective, a carboxyl group, a sulfonic acid group, a phosphoric acid group, and salts thereof are very preferred, and a carboxyl group and a phosphoric acid group are especially preferred. Two or more anionic groups may be used for the purpose of further improving dispersibility. To contain two or more on average is preferred, five or more is more preferred, and ten or more is especially preferred. As anionic groups contained in a dispersant, a plurality of kinds may be contained in one molecule.

Dispersants may further contain a crosslinkable or polymerizable functional group. As the crosslinkable or polymerizable functional groups, ethylenically unsaturated groups capable of addition reaction/polymerization reaction by radical seeds (e.g., a (meth)acryloyl group, an allyl group, a styryl group, a vinyloxy group, etc.), cationic polymerizable groups (an epoxy group, an oxatanyl group, a vinyloxy group, etc.), and polycondensation reactive groups (e.g., a hydrolyzable silyl group, an N-methylol group, etc.) are exemplified, and functional groups having an ethylenically unsaturated group are preferred.

In the invention, dispersers can be used to pulverize inorganic oxide particles. The examples of dispersers include a sand grinder mill (e.g., a beads mill with pins), a high speed impeller mill, a pebble mill, a roller mill, an attritor, and a colloid mill. The sand grinder mill and high speed impeller mill are especially preferred. Further, preliminary dispersion treatment may be performed. The examples of dispersers for use in the preliminary dispersion treatment include a ball mill, a three roll-mill, a kneader and an extruder.

High Refractive Index Inorganic Fine Particles:

For increasing the refractive index of a layer, it is preferred for a hard coat layer to contain inorganic fine particles comprising at least one metal oxide selected from titanium, zirconium, aluminum, indium, zinc, tin and antimony, having an average particle size of from 0.001 to 0.2 μm, preferably from 0.001 to 0.1 μm, and more preferably from 0.001 to 0.06 μm. As the specific examples of the inorganic fine particles for use in the hard coat layer, $TiO_2$, $ZrO_2$, $Al_2O_3$, $In_2O_3$, $ZnO$, $SnO_2$, $Sb_2O_3$, and indium doped with tin (ITO) are exemplified, and $TiO_2$ and $ZrO_2$ are especially preferred in the aspect of increasing the refractive index. It is also preferred for the inorganic fine particles to be surface-treated with a silane coupling agent or a titanium coupling agent, and surface treating agents having on the surfaces of the fillers a functional group capable of reacting with the binder seeds are preferably used.

The addition amount of these inorganic fine particles is preferably from 10 to 90% by mass based on the overall mass of the hard coat layer, more preferably from 20 to 80% by mass, and especially preferably from 30 to 75% by mass.

Since these inorganic fine particles have a particle size smaller than the wavelength of light, scattering does not occur, and the dispersion of the filler dispersed in a binder polymer behaves as an optically uniform material.

Solvent of Coating Solution:

A coating composition is prepared by combining the polyrotaxane of component (A) and the monomer having two or more ethylenically unsaturated groups of component (B) of the invention as described above, and a hard coat layer can be formed of the composition. Solvents for the coating composition are not restricted but it is preferred to contain at least two kinds of volatile solvents.

For example, it is preferred to use at least two kinds of solvents selected from alcohols, derivatives thereof, ethers, ketones, hydrocarbons, and esters in combination. Solvents can be selected in view of solubility of the binder component, stability of the inorganic fine particles, and viscosity regulation of the coating solution.

The especially preferred combination is to use at least two kinds, more preferably three kinds, selected from alcohols, derivatives thereof, ketones and esters. As preferred examples, two or three kinds selected from, for example, methyl ethyl ketone, methyl isobutyl ketone, cyclohexanone, 2-methoxypropanol, 2-butoxyethanol, isopropyl alcohol and toluene can be used in combination.

Layer Constitution of Hard Coat Film:

The hard coat layer of the hard coat film in the invention may be the outermost layer, but there is a case where scratch resistance lowers by the introduction of polyrotaxane, accordingly it is preferred that a scratch resistance-giving layer is laminated. In the scratch resistance-giving layer are also included an antifouling layer having a fouling-preventing function and an antireflection layer having a reflection-preventing function. It is especially preferred to laminate an antireflection layer for the reason of capable of giving an antireflection property in addition to scratch resistance.

In this case, the layer thickness of the scratch resistance-giving layer is preferably from 0.01 to 1.0 µm, more preferably from 0.03 to 0.5 µm, and still more preferably from 0.05 to 0.3 µm. When the layer thickness is in the above range, improving effect of brittleness of the layer containing polyrotaxane can be sufficiently exhibited while providing scratch resistance.

When the hard coat film in the invention is used as an antireflection film, it is also a preferred embodiment to laminate one or more antireflection layers on the surface of the hard coat layer. The layer constitutions of the antireflection layer preferably used in the invention are shown below.

Layer Constitution:

A: A transparent plastic film substrate/a hard coat layer/a low refractive index layer B: A transparent plastic film substrate/a hard coat layer/a high refractive index layer/a low refractive index layer C: A transparent plastic film substrate/a hard coat layer/a medium refractive index layer/a high refractive index layer/a low refractive index layer Low Refractive Index Layer:

In the invention, as described above, it is one of preferred embodiments to provide a low refractive index layer on the outer side of the hard coat layer, that is to say, on the farther side of the transparent support. By the presence of a low refractive index layer, antireflection function can be given to the hard coat film. It is preferred to set the refractive index of a low refractive index layer lower than that the refractive index of the hard coat layer. When the difference in refractive index between the low refractive index layer and the hard coat layer is too small, an antireflection property lowers, while when the difference is too great, the tint of reflected light is liable to increase. The difference in refractive index between the low refractive index layer and the hard coat layer is preferably 0.01 or more and 0.40 or less, and more preferably 0.05 or more and 0.30 or less.

A low refractive index layer can be formed of a low refractive index material. As low refractive index materials, lows refractive index binders can be used. A low refractive index layer can also be formed by the addition of fine particles to a binder. Further, the organosilane compounds disclosed in JP-A-2007-301970, paragraphs [0099] to [0122] can also be used in a low refractive index layer-forming composition.

As low refractive index binders, fluorine-containing copolymers can be preferably used. It is preferred that the fluorine-containing copolymers have a constitutional unit derived from a fluorine-containing vinyl monomer and a constitutional unit for giving a crosslinking property.

Fluorine-Containing Copolymer:

As the fluorine-containing vinyl monomers mainly comprising the fluorine-containing copolymer, fluoroolefins (e.g., fluoroethylene, vinylidene fluoride, tetrafluoroethylene, and hexafluoropropylene), partially or completely fluorinated alkyl ester derivatives of (meth)acrylic acid (e.g., "Viscoat 6FM" (a trade name), manufactured by Osaka Organic Chemical Industry Ltd.), "R-2020" (a trade name, manufactured by Daikin Industries Ltd.), and completely or partially fluorinated vinyl ethers are exemplified, preferably perfluoroolefins, and especially preferably hexafluoropropylene in view of the refractive index, solubility, transparency and availability.

When the composition ratio of the fluorine-containing vinyl monomer is increased, the refractive index can be lowered, but the film strength is liable to lower. It is preferred in the invention to introduce the fluorine-containing vinyl monomer so that the fluorine content of the copolymer is from 20 to 60 mass %, more preferably from 25 to 55 mass %, and especially preferably from 30 to 50 mass %.

As the constitutional units for giving a crosslinking reactive property, the units shown as (A), (B) and (C) below are exemplified.

(A): A constitutional unit obtained by polymerization of a monomer having a self-crosslinking functional group in advance in the molecule such as glycidyl (meth)acrylate and glycidyl vinyl ether;

(B): A constitutional unit obtained by polymerization of a monomer having a carboxyl group, a hydroxyl group, an amino group, or a sulfo group (for example, (meth)acrylic acid, methylol (meth)acrylate, hydroxyalkyl (meth)acrylate, allyl acrylate, hydroxyethyl vinyl ether, hydroxybutyl vinyl ether, maleic acid, crotonic acid, etc.); and (C): A constitutional unit obtained by the reaction of a compound having a group reactive with the functional groups of the above units (A) and (B), and a crosslinkable functional group separately from the above group in the molecule with the constitutional components (A) and (B) (for example, a constitutional unit capable of synthesis by a method of acting acrylic acid chloride on a hydroxyl group).

The crosslinkable functional group of constitutional unit (C) is preferably a photopolymerizable group. As the photopolymerizable groups, a (meth)acryloyl group, an alkenyl group, a cinnamoyl group, a cinnamilidene acetyl group, a benzalacetophenone group, a styrylpyridine group, an α-phenylmaleimide group, a phenylazide group, a sulfonylazide group, a carbonylazide group, a diazo group, an o-quinonediazide group, a furylacryloyl group, a coumarin group, a pyrrone group, an anthracene group, a benzophenone group, a stilbene group, a dithiocarbamate group, a xanthate group, a 1,2,3-thiadiazole group, a cyclopropene group, an azadioxabicyclo group can be exemplified, and these groups may be used not only by one kind alone but also two or more groups. Of these groups, a (meth)acryloyl group and a cinnamoyl group are preferred, and a (meth)acryloyl group is especially preferred.

As the specific methods of preparing a photopolymerizable group-containing copolymer, the following methods can be exemplified, but the invention is by no means restricted to these methods.

a. A method of esterification by the reaction of a crosslinkable functional group-containing copolymer containing a hydroxyl group and a (meth)acrylic acid chloride;

b. A method of uretanization by the reaction of a crosslinkable functional group-containing copolymer containing a hydroxyl group and (meth)acrylic ester containing an isocyanate group;

c. A method of esterification by the reaction of a crosslinkable functional group-containing copolymer containing an epoxy group and a (meth)acrylic acid; and d. A method of esterification by the reaction of a crosslinkable functional group-containing copolymer containing a carboxyl group and (meth)acrylic ester containing an epoxy group.

The amount of the photopolymerizable group to be introduced can be arbitrarily regulated, and the carboxyl group and a hydroxyl group may remain from the aspects of the stability of coated surface, reduction of surface failure in the case of the coexistence of inorganic particles, and improvement of film strength.

In the invention, the introducing amount of the constitutional unit in the copolymer for imparting a crosslinking property is preferably from 10 to 50 mol %, more preferably from 15 to 45 mol %, and especially preferably from 20 to 40 mol %.

In the copolymers useful to the low refractive index layer of the invention, besides the repeating units derived from the above vinyl monomers and constitutional units for giving a crosslinking property, other vinyl monomers can also be arbitrarily copolymerized from various viewpoints of adhesion to the substrate, Tg of the polymers (which is attributable to the hardness of the film), solubility in a solvent, transparency, a sliding property, dust tightness and an antifouling property. These vinyl monomers may be used in combination of two or more, according to purposes, and they are preferably introduced in a range of of from 0 to 65 mol % in total in the copolymer, more preferably in a range of from 0 to 40 mol %, and especially preferably in a range of from 0 to 30 mol %.

Vinyl monomer units usable in combination are not especially restricted and, for example, olefins (e.g., ethylene, propylene, isoprene, vinyl chloride, vinylidene chloride, etc.), acrylic esters (e.g., methyl acrylate, ethyl acrylate, 2-ethylhexyl acrylate, 2-hydroxyethyl acrylate), methacrylic esters (e.g., methyl methacrylate, ethyl methacrylate, butyl methacrylate, 2-hydroxyethyl methacrylate, etc.), styrene derivatives (e.g., styrene, p-hydroxymethylstyrene, p-methoxystyrene, etc.), vinyl ethers (e.g., methyl vinyl ether, ethyl vinyl ether, cyclohexyl vinyl ether, hydroxyethyl vinyl ether, hydroxybutyl vinyl ether, etc.), vinyl esters (e.g., vinyl acetate, vinyl propionate, vinyl cinnamate, etc.), unsaturated carboxylic acids (acrylic acid, methacrylic acid, crotonic acid, maleic acid, itaconic acid, etc.), acrylamides (e.g., N,N-dimethylacrylamide, N-t-butylacrylamide, N-cyclohexylacrylamide, etc.), methacrylamides (e.g., N,N-dimethylmethacrylamide), and acrylonitriles can be exemplified.

Fluorine-containing copolymers especially useful in the invention are random copolymers of perfluoroolefin and vinyl ethers or vinyl esters. It is especially preferred to have a group capable of crosslinking reaction by oneself (a radical reactive group such as a (meth)acryloyl group, etc., and a ring opening polymerizable group such as an epoxy group, an oxetanyl group, etc.). It is preferred for these crosslinking reactive group-containing polymerization units to account for 5 to 70 mol % of all the polymerization units of the polymer, and especially preferably from 30 to 60 mol %. Especially useful polymers are those disclosed in JP-A-2002-243907, JP-A-2002-372601, JP-A-2003-26732, JP-A-2003-222702, JP-A-2003-294911, JP-A-2003-329804, JP-A-2004-4444, and JP-A-2004-45462.

It is preferred that a polysiloxane structure is introduced into the fluorine-containing copolymers useful in the invention for the purpose of giving an antifouling property. The introducing method of a polysiloxane structure is not especially restricted, but a method of introducing polysiloxane block copolymerization component by using a silicone macro-azo initiator as disclosed in JP-A-6-93100, JP-A-11-189621, JP-A-11-228631 and JP-A-2000-313709, and a method of introducing polysiloxane graft copolymerization component by using a silicone macromer disclosed in JP-A-2-251555 and JP-A-2-308806 are preferred. As especially preferred components, the polymers disclosed in Examples 1, 2 and 3 in JP-A-11-189621, and copolymers A-2 and A-3 disclosed in JP-A-2-251555 can be exemplified. These polysiloxane components are preferably contained in an amount of from 0.5 to 10 mass % in the polymer, and especially preferably from 1 to 5 mass %.

The preferred molecular weight of the copolymers preferably used in the invention is 5,000 or more as mass average molecular weight, more preferably from 10,000 to 500,000, and most preferably from 15,000 to 200,000. By using polymers different in the average molecular weight, surface state of the coated film and scratch resistance can also be improved.

As disclosed in JP-A-10-25388 and JP-A-2000-17028, a curing agent having a polymerizable unsaturated group may be optionally used in combination in the above copolymers. Also as described in JP-A-2002-145952, it is also preferred to use a compound having a fluorine-containing polyfunctional polymerizable unsaturated group in combination. As the examples of the compounds having a polyfunctional polymerizable unsaturated group, the polyfunctional monomers described above in the antiglare layer can be exemplified. These compounds show great combined effect of improving scratch resistance and preferred in the case where a compound having a polymerizable unsaturated group is used in the polymer main body.

The refractive index layer of the low refractive index layer is preferably from 1.20 to 1.46, more preferably from 1.25 to 1.42, and especially preferably from 1.30 to 1.38. The thickness of the low refractive index layer is preferably from 50 to 150 nm, and more preferably from 70 to 120 nm.

Fine Particles:

Fine particles that can be preferably used in the low refractive index layer in the invention will be described below.

The coating weight of fine particles contained in the low refractive index layer is preferably from 1 to 100 mg/m$^2$, more preferably from 5 to 80 mg/m$^2$, and still more preferably from 1 to 70 mg/m$^2$. When the coating weight of fine particles is higher than the value of the greatest lower bound, the improving effect of scratch resistance apparently reveals, and when it is lower than the value of the least upper bound, malfunctions such as deteriorations of surface appearance and integrated reflectance due to formation of minute unevenness on the surface of the low refractive index layer do not occur and preferred. Fine particles are contained in the low refractive index layer, so that they are preferably low in refractive index.

Specifically, the fine particles contained in the low refractive index layer are inorganic fine particles, hollow inorganic fine particles, or hollow organic fine particles, and preferably low in refractive index, and especially preferably hollow inorganic fine particles. For example, fine particles of silica or hollow silica (hereinafter also sometimes referred to as "(hollow) silica fine particles") are exemplified. The average particle size of these fine particles is preferably 30% or more and 100% or less of the thickness of the low refractive index layer, more preferably 30% or more and 80% or less, and still more preferably 35% or more and 70% or less. That is to say, when the thickness of the low refractive index layer is 100 nm, the particle size of fine particles is preferably 30 nm or more and 100 nm or less, more preferably 30 nm or more and 80 nm or less, and still more preferably 35 nm or more and 70 nm or less.

(Hollow) silica fine particles as above apparently reveal the improving effect of scratch resistance when the particle size is lower than the above value of the least upper bound, and when the particle size is lower than the value of the least upper bound, malfunctions such as deteriorations of surface appearance and integrated reflectance due to formation of minute unevenness on the surface of the low refractive index layer do not occur and preferred.

(Hollow) silica fine particles may be either crystalline or amorphous, and may be monodispersed particles or agglomerated particles (in this case, it is preferred that the secondary particle size is 30% to 100% of the thickness of the low refractive index layer). A plurality of two or more particles (the kinds and particle sizes) may be used. The shape of particles is most preferably spherical, but amorphous may be used with no restriction.

It is especially preferred to use hollow silica fine particles to lower the refractive index of the low refractive index layer. The refractive index of the hollow silica fine particles is preferably from 1.17 to 1.40, more preferably from 1.17 to 1.35, and still more preferably from 1.17 to 1.30. The refractive index here means the refractive index of the particles as a whole not the refractive index of the shells alone of the silica forming the hollow silica particles. At this time, taking the radius of the void in a particle as $r_i$, and the radius of the shell of a particle as $r_o$, void ratio x is computed according to the following expression (1). Expression (1)

$$x=(4\pi r_i^3/3)/(4\pi r_o^3/3)\times 100$$

Void ratio x is preferably from 10 to 60%, more preferably from 20 to 60%, and most preferably from 30 to 60%. When it is tried to further lower the refractive index of the hollow silica particles and to increase the void ratio, the thickness of the shell becomes thinner and the strength of the particle weakens, therefore, from the viewpoint of scratch resistance, particles of a refractive index of less than 1.17 are difficult. Incidentally, the refractive index of hollow silica particles is measured with an Abbe's refractometer (manufactured by Atago Co., Ltd.).

In the invention, it is preferred to further reduce the surface free energy of the surface of the low refractive index layer in view of the improvement of an antifouling property. Specifically, it is preferred to use a fluorine-containing compound or a compound having a polysiloxane structure in the low refractive index layer.

As additives having a polysiloxane structure, it is preferred to use reactive group-containing polysiloxane (for example, "KF-100T", "X-22-169AS", "KF-102", "X-22-3701IE", "X-22-164B", "X-22-5002", "X-22-173B", "X-22-174D", "X-22-167B", and "X-22-161AS" (trade names, manufactured by Shin-Etsu Chemical Co., Ltd.), "AK-5", "AK-30", and "AK-32" (trade names, manufactured by TOAGOSEI CO., LTD.), and "SILAPLANE FM0725" and "SILAPLANE FM0721" (trade names, manufactured by Chisso Corporation. Further, silicone-based compounds described in JP-A-2003-112383, Tables 2 and 3 can also be preferably used. These polysiloxanes are preferably used in a range of from 0.1 to 10 mass % of all the solids content of the low refractive index layer, and especially preferably in a range of from 1 to 5 mass %.

High Refractive Index Layer/Medium Refractive Index Layer:

In the film in the invention, a layer having a high refractive index can be provided between the low refractive index layer and the hard coat layer to heighten an antireflection property.

In the following specification of the invention, the high refractive index layer and a medium refractive index layer are sometimes called high refractive index layers as a general term. Incidentally, in the invention, "high", "medium" and "low" of a high refractive index layer, a medium refractive index layer and a low refractive index layer show great and small relationship of relative refractive indexes of mutual layers. Further, describing in connection with a transparent support, it is preferred for the refractive indexes to satisfy the relationship of a transparent support>a low refractive index layer, a high refractive index layer>a transparent support.

Further, in the specification of the invention, there are cases where a high refractive index layer, a medium refractive index layer and a low refractive index layer are called antireflection layer as a general term.

For manufacturing an antireflection film by forming a low refractive index layer on a high refractive index layer, the refractive index of the high refractive index layer is preferably from 1.55 to 2.40, more preferably from 1.60 to 2.20, still more preferably from 1.65 to 2.10, and most preferably from 1.80 to 2.00.

When an antireflection film is formed by coating a medium refractive index layer, a high refractive index layer and a low refractive index layer in order from the nearest side from the support, the refractive index of the high refractive index layer is preferably from 1.65 to 2.40, and more preferably from 1.70 to 2.20. The refractive index of the medium refractive index layer is regulated so as to be the value between the refractive index of the low refractive index layer and the refractive index of the high refractive index layer. The refractive index of the medium refractive index layer is preferably from 1.55 to 1.80.

It is preferred for the high refractive index layer and the medium refractive index layer to be formed of a curable composition containing high refractive index inorganic fine particles. As high refractive index inorganic fine particles that can be used here, the high refractive index inorganic fine particles that can be used for raising the refractive index of the hard coat layer can be used.

It is preferred that the high refractive index layer and the medium refractive index layer for use in the invention are formed by preparing coating solutions for forming the high refractive index layer and the medium refractive index layer by dispersing inorganic fine particles in dispersion media, preferably further adding a binder precursor necessary for forming a matrix (for example, the later-described ionizing radiation-curable polyfunctional monomers and polyfunctional oligomers), photopolymerization initiators and the like to the coomposition, coating the prepared coating solutions for forming the high refractive index layer and the medium refractive index layer on a transparent support, and curing the coated layers by crosslinking reaction or polymerization reaction of ionizing radiation-curable compounds (for example, polyfunctional monomers and polyfunctional oligomers).

Further, it is preferred to subject the binders of the high refractive index layer and the medium refractive index layer to crosslinking reaction or polymerization reaction with a dispersant simultaneously with or after coating the layers.

In the thus-manufactured binders of the high refractive index layer and the medium refractive index layer, the above preferred dispersant and ionizing radiation-curable polyfunctional monomers and polyfunctional oligomers are subjected to crosslinking reaction or polymerization reaction and the anionic groups of the dispersant take the form of being taken in the binder. Further, in the binders of the high refractive index layer and the medium refractive index layer, anionic groups have a function capable of maintaining the dispersed state of the inorganic particles, and the crosslinked or polymerized structure gives film-forming ability to the binder to improve the physical strength, chemical resistance and weather proofness of the high refractive index layer and the medium refractive index layer containing the inorganic particles.

The binder for the high refractive index layer is added in an amount of from 5 to 80 mass % of the solids content of the coating composition of the layer.

The content of the inorganic particles in the high refractive index layer is preferably from 10 to 90 mass % of the mass of the high refractive index layer, more preferably from 15 to 80 mass %, and especially preferably from 15 to 75 mass %. Two or more kinds of inorganic particles may be used in combination in the high refractive index layer.

When the low refractive index layer is formed on the high refractive index layer, the refractive index of the high refractive index layer is preferably higher than the refractive index of the transparent support.

Binders capable of obtaining by crosslinking or polymerization reaction of ionizing radiation-curable compounds containing an aromatic ring, ionizing radiation-curable compounds containing halogen elements other than fluorine (e.g., Br, I, Cl, etc.), or ionizing radiation-curable compounds containing atoms such as S, N, P, and the like can also be preferably used in the high refractive index layer.

The layer thickness of the high refractive index layer can be properly designed according to the purpose. When the high refractive index layer is used as an optical interference layer, the layer thickness is preferably from 30 to 200 nm, more preferably from 50 to 170 nm, and especially preferably from 60 to 150 nm.

The lower, the better is the haze of the high refractive index layer when particles giving an antiglare function are not contained. The haze is preferably 5% or less, more preferably 3% or less, and especially preferably 1% or less.

The high refractive index layer is preferably formed directly on a transparent support or via other layer.
Formation of Layers:

The hard coat layer, the antireflection layer, and other layers, according to necessity, for use in the invention are formed by coating each coating solution on a transparent substrate film, heating, drying, and then, if necessary, light irradiation and/or heating to cure the monomer and curable resin for forming each layer, by which each layer is formed.

The coating method of each layer of the hard coat film in the invention is not especially restricted. Well-known methods such as a dip coating method, an air knife coating method, a curtain coating method, a roller coating method, a wire bar coating method, a gravure coating method, an extrusion coating method (a die coating method) (refer to U.S. Pat. No. 2,681,294), and a micro gravure coating method are used. Of these methods, a micro gravure coating method and a die coating method are preferably used, and for the supply in high productivity, a die coating method is preferably used.

It is preferred to perform drying on conditions that the concentration of organic solvent in the coated film is 5 mass % or less after drying, more preferably 2 mass % or less, and still more preferably 1 mass % or less.

Drying conditions are affected by thermal intensity of the substrate, transfer speed, and the length of drying process, but it is preferred that the content of an organic solvent is as small as possible in the points of film hardness and adhesion prevention. When organic solvent are not contained, it is also possible to perform ultraviolet irradiation immediately after coating by omitting a drying process.

The hard coat layer in the invention may be subjected to heat treatment for heightening the degree of crystallization. A preferred heat treatment temperature is from 40 to 130° C. Heat treatment time can be arbitrarily determined depending on desired degree of crystallization, but the time is generally from 5 minutes to 48 hours.
Surface Treatment:

A transparent support may be subjected to surface treatment.

The examples of the surface treatments include chemical treatment, mechanical treatment, corona discharge treatment, flame treatment, UV irradiation treatment, high frequency treatment, glow discharge treatment, active plasma treatment, laser treatment, mixed acid treatment, and ozone oxidation treatment. Specifically, the contents in Hatsumei Kyokai Kokai Giho Kogi No. 2001-1745 (published on Mar. 15, 2001), pp. 30 and 31, and JP-A-2001-9973 are exemplified. Of these treatments, glow discharge treatment, UV irradiation treatment, corona discharge treatment, and flame treatment are preferred, and glow discharge treatment and UV irradiation treatment are more preferred.
Saponification Treatment:

When the hard coat film of the invention is used in a liquid crystal display, the hard coat film is provided with an adhesive layer on one side and arranged on the outermost surface of the display. When the transparent plastic film substrate is triacetyl cellulose, since triacetyl cellulose is used as a protective film for protecting the polarizing layer of the polarizing plate, it is economically preferred to use the hard coat film of the invention as the protective film as it is.

When the hard coat film of the invention is arranged on the outermost surface of a display by providing an adhesive layer on one side or the like or used as the protective film for a polarizing plate as it is, it is preferred to form an outermost layer mainly comprising a fluorine-containing polymer on the transparent plastic film substrate for sufficient adhesion, and then perform saponification treatment. Saponification treatment is performed according to known methods, for example, the film is immersed in an alkali solution for a proper period of time. After immersion in an alkali solution, it is preferred to thoroughly wash the film with water so that the alkali component does not remain in the film, or immerse the film in a dilute acid to neutralize the alkali component.

By the saponification treatment, the surface of the transparent plastic film substrate of the side opposite to the side having the outermost layer is hydrophilized.

The hydrophilized surface is especially effective to improve adhesion to a polarizing film mainly comprising polyvinyl alcohol. Further, since dusts in air are hardly adhered to the hydrophilized surface, dusts are difficult to get between the polarizing film and the optical film in adhering to the polarizing film, so that the hydrophilized surface is effective to prevent point defect by dusts.

It is preferred to perform saponification treatment so that the surface of a transparent plastic film substrate opposite to the side having an outermost layer have a contact angle to water of 40° or less, more preferably 30° or less, and especially preferably 20° or less.

The specific means of alkali saponification treatment can be selected from the following two means of (1) and (2). Means (1) is superior for the reason that the treatment can be carried out by the same process with general purpose triacetyl cellulose. However, there are possibilities of problems in means (1) such that even the antireflection film surface is saponification treated, so that the surface is hydrolyzed and deteriorated, and the saponification treatment solution causes fouling, if remains. In that case, although it is a special process, means (2) is superior.

(1) After forming a hard coat layer on a transparent plastic film substrate, the reverse face of the film is subjected to saponification treatment by immersion in an alkali solution at least one time.
(2) Before or after forming a hard coat layer on a transparent plastic film substrate, an alkali solution is coated on the side of the optical film opposite to the side on which an optical film is formed, heated, washed, and/or neutralized to subject only the reverse face of the film to saponification treatment.

Film-Forming Method:

A hard coat film of the invention can be formed by the following methods but the invention is not restricted thereto.

In the first place, a coating solution containing the components for forming each layer is prepared. The coating solution is coated on a transparent support by a dip coating method, an air knife coating method, a curtain coating method, a roller coating method, a wire bar coating method, a gravure coating method, or an extrusion coating method (refer to U.S. Pat. No. 2,681,294), heated, and dried. Of these coating methods, a gravure coating method is preferably capable of coating in a uniform thickness with a small amount of coating solution such as each layer of an antireflection film. Of the gravure coating methods, a micro gravure coating method is high in uniform thickness and more preferred.

Further, a highly uniform thickness can be achieved with a small amount of coating solution by a die coating method. In addition, since a die coating method is a pre-weighing system, a film thickness can be relatively easily controlled, and further, accompanied by little evapotranspiration of solvents in coating so that preferred. Two or more layers may be coated at the same time. Simultaneous coating methods are disclosed in U.S. Pat. Nos. 2,761,791, 2,941,898, 3,508,947, 3,526,528, and Yuji Harasaki, Coating Kogaku (Coating Engineering), page 253, Asakura Shoten (1973).

Polarizing Plate:

A polarizing plate mainly consists of a polarizing film and two protective films sandwiching the polarizing film. The optical film in the invention is preferably used as at least one protective film of the two protective films sandwiching the polarizing film. Since the hard coat film in the invention unites the protective film, the manufacturing costs of polarizing plates can be reduced. Further, by using the hard coat film in the invention as the outermost layer, mirroring of outer light is prevented, and a polarizing plate free from the occurrence of interference mottle and excellent in prevention of dust adhesion can be manufactured.

As polarizing films, well-known polarizing films, and polarizing films cut out of a continuous sheet of a polarizing film having absorption axis not parallel or perpendicular to the machine direction may be used. A continuous sheet of a polarizing film having an absorption axis not parallel or perpendicular to the machine direction is manufactured as follows.

Tensile force is applied to a continuously supplied polymer film to stretch while holding both ends of the polymer film with a holding means, and the film is stretched at least 1.1 to 20.0 times in the film width direction. The difference in the traveling speed of the holding apparatus at both ends of the film in the machine direction is within 3%, and the traveling direction of the film is flexed so that the angle formed by the traveling direction of the film at the outlet of process of holding both ends of the film and the substantial stretching direction of the film is inclined at 20 to 70° with holding both ends of the film. In particular, a polarizing film manufactured by inclination of 45° is preferably used from the point of productivity.

The stretching methods of a polymer film are disclosed in detail in JP-A-2002-86554, paragraphs [0020] to [0030].

The hard coat film of the invention can be preferably used in liquid crystal displays of the modes of a transmission type, a reflection type, and a semi-transmission type such as twisted nematic (TN), super twisted nematic (STN), vertical alignment (VA), in-plane switching (IPS), and optically compensated bend cell (OCB) when used as one side of the surface protective film of a polarizing film.

EXAMPLE

The invention will be described in detail with reference to examples, but the invention is by no means restricted thereto. In the examples "parts" and "%" are based on mass unless otherwise indicated.

Preparation of Polyrotaxane and Crosslinked Polyrotaxane:

Polyrotaxane and crosslinked polyrotaxane are prepared with reference to the preparation methods disclosed in patent documents 1 and 2 as shown below.

A preparation method of a compound in a case of using α-cyclodextrin as the cyclic molecule, polyethylene glycol as the straight chain molecule, a 2,4-dinitrophenyl group as the blocking group, an acetyl group as the hydrophobic group, and an acryloyl group as the unsaturated double bond group is described below.

For blocking treatment to be performed later, a polyethylene glycol derivative is obtained by modifying both terminals of the polyethylene glycol to amino groups. Polyrotaxane is prepared by mixing the α-cyclodextrin and the polyethylene glycol derivative. At the time of preparation, when the maximum clathrating amount is taken as 1, it is possible to make, for example, mixing time 1 to 48 hours and mixing temperature 0 to 100° C. so that clathrating amount becomes 0.001 to 0.6 of the maximum clathrating amount of 1.

In general, a maximum of 230 α-cyclodextrins can be clathrated to polyethylene glycol of average molecular weight of 20,000. Accordingly, this value is the maximum clathrating amount. The above condition is a condition to clathrate from 60 to 65 α-cyclodextrins on average (63) with polyethylene glycol of average molecular weight of 20,000, that is, the value of from 0.26 to 0.29 (0.28) of the maximum clathrating amount. The clathrating amount of α-cyclodextrins can be confirmed by NMR, light absorption, elemental analysis and the like.

Blocked polyrotaxane (unmodified polyrotaxane) is obtained by reacting the obtained polyrotaxane with 2,4-dinitrofluorobenzene dissolved in DMF.

Subsequently, hydrophobitization modified polyrotaxane is obtained by modifying the hydroxyl group of the cyclodextrin ring of the obtained unmodified polyrotaxane with an acetyl group of a hydrophobic group by using an acetic anhydride.

Further, an unmodified hydroxyl group of the cyclodextrin ring of the hydrophobitization modified polyrotaxane is modified with acrylic acid chloride to an acryloyl group to obtain polyrotaxane hydrophobitization modified and having an unsaturated double bond.

Preparation of Unmodified Polyrotaxane (PR-1):
Preparation of terminal sequestered polyrotaxane:

Polyethylene glycol bisamine having a number average molecular weight of 20,000 (4.5 g) and 18.0 g of α-cyclodextrin are added to 150 ml of water, and heated at 80° C. to be dissolved. The solution is cooled and allowed to stand at 5° C. for 16 hours. White pasty precipitate formed is batched off and dried.

To the obtained pried product, 12.0 g of 2,4-dinitrofluorobenzene and 50 g of dimethylformamide are added and the mixture is stirred at room temperature for 5 hours. After 200 ml of dimethyl sulfoxide (DMSO) is added to the reaction mixture and dissolved, the solution is poured into 3,750 ml of water and a precipitate is batched off. After the precipitate is dissolved again in 250 ml of DMSO, the resulting solution is poured into 3,500 ml of a 0.1% brine, and a precipitate is batched off. The precipitate is washed with water and methanol three times each, and then vacuum dried at 50° C. for 12 hours to obtain 2.0 g of a clathrated compound wherein polyethylene glycol bisamine is clathrated like skewering by α-cyclodextrin, and 2,4-dinitrophenyl groups are bonded to the amino groups of both terminals. The obtained product is designated as unmodified polyrotaxane (PR-1).

The ultraviolet absorption and $^1$H-NMR of the obtained clathrated compound (terminal sequestered blocked polyrotaxane) are measured to compute the amount of clathration of α-cyclodextrin. The amount of clathration is 72.

The amount of clathration can be computed from the measurements of the ultraviolet absorption and $^1$H-NMR. Specifically in the measurement of the ultraviolet absorption, the amount of clathration of cyclodextrin is computed by measuring the molar extinction coefficients of the synthesized clathrated compound and 2,4-dinitroaniline at 360 nm. Further, in the measurement of $^1$H-NMR, the amount is computed from the integral ratio of the hydrogen atoms in the polyethylene part and the hydrogen atoms in the cyclodextrin part.

Preparation of Hydrophobitization Modified Polyrotaxane (PR-2):
Acetyl Modification of Terminal Sequestered Blocked Polyrotaxane:

The unmodified polyrotaxane (PR-1) synthesized above (I g) is dissolved in 50 g of an 8% lithium chloride/N,N-dimethylacetamide. Acetic anhydride (6.7 g), 5.2 g of pyridine, and 100 mg of N,N-dimethylaminopyridine are added to the above solution and stirred at room temperature overnight. The reaction solution is poured into methanol, and the precipitated solid is separated by centrifugal separation. The separated solid is dried and dissolved in acetone. The solution is poured into water, and the precipitated solid is separated by centrifugal separation and dried to obtain 1.2 g of acetyl-modified hydrophobitization modified polyrotaxane (PR-2).

Introduced amount of acetyl of the obtained acetyl-modified polyrotaxane measured by $^1$H-NMR and computed is 75%.

Preparation of Polyrotaxane Having Unsaturated Double Bond (PR-3):
Introduction of Polymerizable Group:

Acetyl-modified hydrophobitization modified polyrotaxane (PR-2) synthesized above (1 g) is dissolved in 50 g of an 8% lithium chloride/N,N-dimethylacetamide. Acryloyl chloride (5.9 g), 5.2 g of pyridine, and 100 mg of N,N-dimethylaminopyridine are added to the above solution and stirred at room temperature two nights. The reaction solution is poured into methanol, and the precipitated solid is separated by centrifugal separation. The separated solid is dried and dissolved in acetone. The solution is poured into water, and the precipitated solid is separated by centrifugal separation and dried to obtain 0.8 g of polyrotaxane modified with acryloyl and acetyl (PR-3).

$^1$H-NMR measurement of polyrotaxane modified by acryloyl and acetyl (PR-3) is performed and introduced amount of acryloyl and acetyl is computed. The introduced amount is 87%. That is, the introduced amount of acryloyl is 12%.

Preparation of Coating Solution for Hard Coat:

Each of the coating solutions for hard coat layers (HCL-1) to (HCL-8) is prepared by mixing the materials according to the following composition and filtering the obtained mixture through a polypropylene filter having a pore diameter of 3 μm.

TABLE 1

| | | HCL-1 | HCL-2 | HCL-3 | HCL-4 | HCL-5 | HCL-6 | HCL-7 | HCL-8 |
|---|---|---|---|---|---|---|---|---|---|
| Polyrotaxane compound | PR1 (unmodified) | 6.00 | | | | | | | |
| | PR2 (hydrophobitized) | | 6.00 | | | | | | |
| | PR3 (double bond) | | | 6.00 | 6.00 | 12.00 | 3.00 | 1.50 | |
| Binder | PET-30 | 23.25 | 23.25 | 23.25 | 17.25 | 5.25 | 20.25 | 21.75 | 29.25 |
| | DPHA | | | | | 6.00 | | | |
| | Viscoat 360 | | | | 6.00 | 6.00 | 6.00 | 6.00 | |
| Photo-polymerization initiator | Irgacure 907 | 0.75 | 0.75 | 0.75 | 0.75 | 0.75 | 0.75 | 0.75 | 0.75 |
| Solvent | MIBK | 49.00 | 49.00 | 49.00 | 49.00 | 49.00 | 49.00 | 49.00 | 49.00 |
| | MEK | 21.00 | 21.00 | 21.00 | 21.00 | 21.00 | 21.00 | 21.00 | 21.00 |
| Blending rate of polyrotaxane (/solids content) | | 20.0% | 20.0% | 20.0% | 20.0% | 40.0% | 10.0% | 5.0% | 0.0% |

The compounds other than the polyrotaxane used in each of the coating solutions for the hard coat layers are shown below.

PET-30: A mixture of pentaerythritol triacrylate and pentaerythritol tetraacrylate (manufactured by Nippon Kayaku Co., Ltd.)

DPHA: A mixture of dipentaerythritol pentaacrylate and dipentaerythritol hexaacrylate "DPHA" (manufactured by Nippon Kayaku Co., Ltd.)

Viscoat 360: Ethylene oxide modified trimethylolpropane triacrylate (manufactured by Osaka Organic Chemical Industry Ltd.)

Irgacure 907: A photopolymerization initiator (manufactured by Ciba Japan K.K.)

MIBK: Methyl isobutyl ketone

MEK: Methyl ethyl ketone

Preparation of Coating Solution for Low Refractive Index Layer:

Preparation of Sol Solution a:

To a reaction vessel equipped with a stirrer and a reflux condenser, 120 mass parts of methyl ethyl ketone, 100 mass parts of acryloxypropyltrimethoxysilane "KBM-5103" (manufactured by Shin-Etsu Chemical Co., Ltd.), and 3 mass parts of diisopropoxyaluminum ethyl acetoacetate are put and mixed. Ion exchange water (30 mass parts) is added to the above mixture, followed by reaction at 60° C. for 4 hours. The temperature of the reaction solution is then lowered to room temperature to obtain sol solution a. A mass average molecular weight of sol solution a is 1,800. Of the components higher than the oligomer component, the components having a molecular weight of from 1,000 to 20,000 account for 100 mass %. From the analysis by gas chromatography, it is confirmed that acryloxypropyltrimethoxysilane of the raw material is not remained at all.

Preparation of Dispersion of Hollow Silica Fine Particles (A-1):

To 500 mass parts of hollow silica fine particles (a particle size: about 40 to 50 nm, a thickness of shell: 6 to 8 nm, a refractive index: 1.31, solid concentration: 20 mass %, main solvent: isopropyl alcohol, prepared according to Preparation Example 4 disclosed in JP-A-2002-79616 by changing the particle size), 30 mass parts of acryloxypropyltrimethoxysilane "KBM-5103" (manufactured by Shin-Etsu Chemical Co., Ltd.), and 1.5 mass parts of diisopropoxyaluminum ethyl acetoacetate "Kerope EP-12" (manufactured by Hope Chemical Co., Ltd.) are added and mixed, and then 9 mass parts of ion exchange water is added thereto. After allowing the reaction to proceed at 60° C. for 8 hours, the reaction solution is cooled to room temperature, and 1.8 parts of acetylacetone is added to obtain hollow silica particle dispersion (A-1). The solid concentration of the obtained hollow silica particle dispersion is 18 mass % and the refractive index after drying the solvent is 1.31.

Preparation of Coating Solution for Low Refractive Index Layer (LL-1):

Fluorine-containing copolymer (P-3) disclosed in JP-A-2004-45462 (a weight average molecular weight: about 50,000) (44.0 mass parts), 6.0 mass parts of a mixture of dipentaerythritol pentaacrylate and dipentaerythritol hexaacrylate "DPHA" (manufactured by Nippon Kayaku Co., Ltd.), 3.0 pass parts of terminal methacrylate group-containing silicone "RMS-033" (manufactured by Gelest), and 3.0 mass parts of "Irgacure 907" (manufactured by Ciba Japan K.K.) are added to 100 mass parts of methyl ethyl ketone and dissolved. After that, 195 mass parts of hollow silica fine particle dispersion (A-1) (39.0 mass parts as silica+ solid content of the surface treating agent), and 17.2 mass parts of sol solution a (5.0 mass parts as solid content) are added to the above solution. The obtained solution is distilled with cyclohexane and methyl ethyl ketone so that the ratio of cyclohexane and methyl ethyl ketone becomes 10/9 to obtain a coating solution for a low refractive index layer (LL-1).

Incidentally, the refractive index of the film obtained by coating the coating solution is 1.38.

Manufacture of Hard Coat Film:

Coating of Hard Coat Layer:

A triacetyl cellulose film having a thickness of 80 μm (TAC-TD80U, a refractive index: 1.48, manufactured by Fuji Photo Film Co., Ltd.) is unwound from a roll. Each of the coating solutions for hard coat layer (HCL-1) to (HCL-8) is coated with a slot die coater as disclosed in JP-A-2003-211052, FIG. 1, in a dry film thickness shown in Table 2 below, and dried at 30° C. for 15 seconds and 90° C. for 20 seconds. The film is further irradiated with UV-ray under nitrogen purge at oxygen concentration of 100 ppm or less, with an air cooling metal halide lamp of 160 W/cm (manufactured by EYEGRAPHICS CO., LTD.), irradiation quantity of 70 mJ/cm$^2$ to manufacture hard coat films (HC-1) to (HC-15) each having a cured layer, and the films are rewound.

The hard coat layer corresponding to Example 1-10 is manufactured as follows: after coating hard coat layer coating solution (HCL-8) in a thickness of 6 μm on the above condition, hard coat layer coating solution (HCL-4) is further laminated in a thickness of 12 μm.

Coating of Low Refractive Index Layer:

On each of the hard coat layers of the hard coat films (HC-1) to (HC-14) manufactured above, low refractive index layer coating solution (LL-1) is coated by wet coating with a slot die coater as disclosed in JP-A-2003-211052, FIG. 1, in a dry film thickness of the low refractive index layer of 100 nm, and dried at 60° C. for 50 seconds. The film is further irradiated with UV-ray under nitrogen purge at oxygen concentration of 100 ppm or less, with an air cooling metal halide lamp of 240 W/cm (manufactured by EYEGRAPHICS CO., LTD.), and irradiation quantity of 400 mJ/cm$^2$ to form a low refractive index layer, and each film is rewound. Thus antireflective hard coat films of Sample Nos. 101 to 114 are obtained.

Evaluation of Antireflection Film:

These antireflective hard coat films are evaluated according to the following methods. The results obtained are shown in Table 2 below.

Incidentally, haze is evaluated according to the later-described [1] of (6) shown in the antiglare hard coat film. The sample of Sample No. 114 cannot be evaluated due to cracking generated on the hard coat layer at the time of lamination of the hard coat layer.

(1) Average Reflectance

The side not laminated with a hard coat layer of an antireflective hard coat film is roughened with sand paper, subjected to light absorption treatment with black ink (transmittance at 380 to 780 nm is less than 10%), and measurement is performed on a black table on the following condition.

A spectrophotometer "V-550" (manufactured by JASCO Corporation) is adapted with an adaptor "ARV-474", and mirror reflectivity of outgoing angle of −5° at incident angle of 5° is measured in the wavelength region of from 380 to 780 nm. Average reflectance at 450 to 650 nm is used on the result.

(2) Evaluation of Pencil Hardness

As the index of scratch resistance, pencil hardness in accordance with JIS K 5400 is evaluated. After the antireflective hard coat film is subjected to humidity conditioning at temperature of 25° C. and humidity of RH 60% for 2 hours, scratch test is repeated five times with 2H to 5H pencils for test prescribed in JIS S 6006 with a load of 4.9 N, followed by standing on the condition of 25° C. 60% RH for 24 hours. Hardness is evaluated by the following criteria, and the highest hardness acquired OK is taken as evaluation value.
OK: In the evaluation of n=5, scratches are 2 or less.
NG: In the evaluation of n=5, scratches are 3 or more.
(3) Evaluation of Curling An antireflective hard coat film prepared is cut to a size of 35 mm x 125 mm, and after being placed on a plate at 25° C. 60% RH for 2 hours, the heights of curved four corners are measured, and the average value is evaluated by the following four grades. An average value of 15 mm or more is the level low in practicability.
A: Less than 5 mm
B: 5 mm or more and less than 10 mm
C: 10 mm or more and less than 15 mm
D: 15 mm or more
(4) Evaluation of Flexing Property An antireflective hard coat film prepared is cut to a size of 35 mm×125 mm, after being placed on a plate at 25° C. 60% RH for 2 hours, the film is wound around rolls different in diameter with the hard coat layer outside, and the presence of a crack in the hard coat layer is judged. The smallest diameter free from a crack is taken as the value of the flexing property, and evaluated by the following four grades.
A: Less than 5 mm
B: 5 mm or more and less than 10 mm
C: 10 mm or more and less than 15 mm
D: 15 mm or more
(5) Thickness of Hard Coat Layer The thickness of the hard coat film as a whole and the thickness of the transparent plastic film substrate are measured with a micro-gauge thickness meter (manufactured by Mitsutoyo Co., Ltd.). The thickness of the hard coat layer is computed by subtracting the transparent plastic film substrate from the thickness of the hard coat film as a whole.

property conspicuously deteriorate. The antireflective hard coat film having the hard coat layer having a thickness of 20 μm is cracked and a practicable hard coat layer cannot be formed.

Contrary to this, those having the hard coat layer to which polyrotaxane is introduced can form a thick hard coat layer, and can form a hard coat film high in surface hardness and excellent in a flexing property and curling.

Further, in Example 1-2, haze increases by the introduction of polyrotaxane, but increase in haze can be suppressed by the use of hydrophobitization modified polyrotaxane (Examples 1-3 to 1-10 as opposed to Example 1-2).

Those using polyrotaxane having an unsaturated double bond group (Examples 1-4 to 1-10) can further improve a flexing property.

The antireflective hard coat films using ethylene oxide modified acrylate in a part of component (B) (Examples 1-5 to 1-10) can further restrain increase in haze.

Further, those using ethylene oxide modified acrylate in a part of component (B) can obtain a hard coat film high in surface hardness, good in curling and a flexing property and not accompanied by increase in haze by optimizing the blending ratio of polyrotaxane and film thickness.

In addition, curling and a flexing property can also be bettered by a constitution having a two-layer construction of lamination of a hard coat layer containing the polyrotaxane of the invention on a hard coat layer not containing conventional polyrotaxane as shown in Example 1-10, which is a preferred embodiment.

Manufacture of Polarizing Plate and Liquid Crystal Display:

Examples 11-1 to 11-10

Polarizing plates with an antireflection film are manufactured as follows. A triacetyl cellulose film having a thickness

TABLE 2

| Example No. | Sample No. | Hard Coat Layer Coating Solution | Thickness of Hard Coat Layer (μm) | Pencil Hardness | Curling | Flexing Property | Haze (%) | Reflectance (%) |
|---|---|---|---|---|---|---|---|---|
| Example 1-1 | 101 | HCL-1 | 6 | 3H | A | A | 1 | 1.6 |
| Example 1-2 | 102 | HCL-1 | 12 | 4H | B | C | 3 | 1.6 |
| Example 1-3 | 103 | HCL-2 | 12 | 4H | B | C | 2 | 1.6 |
| Example 1-4 | 104 | HCL-3 | 12 | 4H | B | A | 2 | 1.6 |
| Example 1-5 | 105 | HCL-4 | 12 | 4H | A | A | 1 | 1.6 |
| Example 1-6 | 106 | HCL-4 | 20 | 5H | B | B | 1 | 1.6 |
| Example 1-7 | 107 | HCL-5 | 25 | 5H | A | A | 1 | 1.6 |
| Example 1-8 | 108 | HCL-6 | 12 | 5H | B | C | 1 | 1.6 |
| Example 1-9 | 109 | HCL-7 | 12 | 5H | C | C | 1 | 1.6 |
| Example 1-10 | 110 | HCL-8/HCL-4 | 6/12 | 5H | B | B | 1 | 1.6 |
| Comparative Example 1-1 | 111 | HCL-8 | 6 | 3H | B | B | 1 | 1.6 |
| Comparative Example 1-2 | 112 | HCL-8 | 10 | 4H | D | C | 1 | 1.6 |
| Comparative Example 1-3 | 113 | HCL-8 | 12 | 5H | D | D | 1 | 1.6 |
| Comparative Example 1-4 | 114 | HCL-8 | 20 | — | — | — | — | — |

From the results shown in Table 2, the following matters are apparent.

Curling and a flexing property can be improved by the introduction of polyrotaxane to the hard coat layer as opposed to the antireflective hard coat film not containing polyrotaxane in the hard coat layer.

In particular, when the thickness of the hard coat layer not containing polyrotaxane is thickened, curling and flexing of 80 μm (TAC-TD80U, manufactured by Fuji Photo Film Co., Ltd.) immersed in an NaOH aqueous solution of 1.5 mol/liter 55° C. for 2 minutes and then neutralized and washed with water is adhered on one side of a polarizer prepared by adsorbing iodine on polyvinyl alcohol and stretching, and sticking each of the antireflection films of Sample Nos. 101 to 110 of Examples 1-1 to 1-10 on the other side of the polarizer.

By using each of the polarizing plates prepared above, a liquid crystal display having the antireflection layer arranged on the outermost layer is manufactured. Each liquid crystal display shows low reflectance, mirroring of outer light is little, reflected images are inconspicuous, and visibility is high.

The invention has been described above by the antireflective hard coat film formed by lamination of a low refractive index layer on a hard coat layer having surface smoothness and free from inside scattering as the example. In the next place, the invention will be described with reference to a hard coat film not having a low refractive index layer as the example. Manufacture of Hard Coat Film:

Coating of Hard Coat Layer:

A triacetyl cellulose film having a thickness of 80 μm (TAC-TD80U, a refractive index: 1.48, manufactured by Fuji Photo Film Co., Ltd.) is unwound from a roll. Each of the coating solutions for hard coat layer (HCL-1) to (HCL-8) is coated with a slot die coater as disclosed in JP-A-2003-211052, FIG. 1, in a dry film thickness shown in Table 3 below, and dried at 30° C. for 15 seconds and 90° C. for 20 seconds. The film is further irradiated with UV-ray under nitrogen purge at oxygen concentration of 100 ppm or less, with an air cooling metal halide lamp of 240 W/cm (manufactured by EYEGRAPHICS CO., LTD.), irradiation quantity of 400 mJ/cm² to manufacture hard coat films of Sample Nos. 201 to 214 each having a cured layer, and evaluated similarly to the above antireflective hard coat films.

The hard coat layer corresponding to Example 2-10 is manufactured as follows: after coating hard coat layer coating solution (HCL-8) in a thickness of 6 μm on the above condition, hard coat layer coating solution (HCL-4) is further laminated in a thickness of 12 μm.

Incidentally, the hard coat film sample of Sample No. 214 cannot be evaluated due to cracking generated on the hard coat layer at the time of lamination of the hard coat layer.

The invention has been described above by the hard coat film having a hard coat layer having surface smoothness and substantially free from inside scattering as the example. In the next place, the example of application to an antiglare film having an antiglare property due to surface unevenness and an inside scattering property is shown.

Preparation of Coating Solution for Antiglare Hard Coat Layer:

A coating solution for an antiglare hard coat layer is prepared by blending the materials according to the composition shown in Table 4 below and filtering the obtained mixture through a polypropylene filter having a pore diameter of 30 μm.

TABLE 4

|  |  | HCL-11 | HCL-12 | HCL-13 | HCL-14 |
|---|---|---|---|---|---|
| Polyrotaxane compound | PR3 (double bond) | 6.00 | 6.00 | 6.00 | |
| Binder | PET-30 | 23.00 | 17.00 | 21.00 | 29.00 |
|  | Viscoat 360 |  | 6.00 | 6.00 |  |
| Resin particles | Acryl particles having a particle size of 8 μm | 3.00 | 3.00 | 1.80 | 3.00 |
|  | Acryl-styrene particles having a particle size of 8 μm | 7.00 | 7.00 | 4.20 | 7.00 |
| Photo-polymerization initiator | Irgacure 127 | 0.75 | 0.75 | 0.75 | 0.75 |
| Thickener | CAB | 0.22 | 0.22 | 0.22 | 0.22 |
| Leveling agent | SP-13 | 0.09 | 0.09 | 0.09 | 0.09 |
| Solvent | MIBK | 42.00 | 42.00 | 42.00 | 42.00 |
|  | MEK | 18.00 | 18.00 | 18.00 | 18.00 |
| Blending rate of polyrotaxane (/solids content) |  | 17.6% | 17.6% | 17.6% | 0.0% |

TABLE 3

| Example No. | Sample No. | Hard Coat Layer Coating Solution | Thickness of Hard Coat Layer (μm) | Pencil Hardness | Curling | Flexing Property | Haze (%) |
|---|---|---|---|---|---|---|---|
| Example 2-1 | 201 | HCL-1 | 6 | 3H | A | A | 1 |
| Example 2-2 | 202 | HCL-1 | 12 | 4H | B | C | 3 |
| Example 2-3 | 203 | HCL-2 | 12 | 4H | B | C | 2 |
| Example 2-4 | 204 | HCL-3 | 12 | 4H | B | A | 2 |
| Example 2-5 | 205 | HCL-4 | 12 | 4H | A | A | 1 |
| Example 2-6 | 206 | HCL-4 | 20 | 5H | B | B | 1 |
| Example 2-7 | 207 | HCL-5 | 25 | 5H | A | A | 1 |
| Example 2-8 | 208 | HCL-6 | 12 | 5H | B | C | 1 |
| Example 2-9 | 209 | HCL-7 | 12 | 5H | C | C | 1 |
| Example 2-10 | 210 | HCL-8/HCL-4 | 6/12 | 5H | B | B | 1 |
| Comparative Example 2-1 | 211 | HCL-8 | 6 | 3H | B | B | 1 |
| Comparative Example 2-2 | 212 | HCL-8 | 10 | 4H | D | C | 1 |
| Comparative Example 2-3 | 213 | HCL-8 | 12 | 5H | D | D | 1 |
| Comparative Example 2-4 | 214 | HCL-8 | 20 | — | — | — | — |

From the results shown in Table 3, the following matters are apparent.

Even in the hard coat film not laminating a low refractive index layer, the improving effect of curling and a flexing property can be obtained similarly to the hard coat film having a low refractive index layer by the introduction of polyrotaxane to the hard coat layer.

The compounds used in each of the coating solutions for the antiglare hard coat layers are shown below.

PET-30: A mixture of pentaerythritol triacrylate and pentaerythritol tetraacrylate (manufactured by Nippon Kayaku Co., Ltd.)

Viscoat 360: Ethylene oxide modified trimethylolpropane triacrylate (manufactured by Osaka Organic Chemical Industry Ltd.)

Crosslinked acryl particles having a particle size of 8 μm: Used as a 30 wt % methyl isobutyl ketone dispersion of crosslinked acryl particles having an average particle size of 8.0 μm (a refractive index: 1.500)

Crosslinked acryl-styrene particles having a particle size of 8.0 μm: Used as a 30 wt % methyl isobutyl ketone dispersion of crosslinked acryl-styrene particles having a particle size of 8.0 μm (a refractive index: 1.555)

Irgacure 127: A photopolymerization initiator (manufactured by Ciba Japan K.K.) CAB: Cellulose acetate butyrate MBK: Methyl isobutyl ketone MEK: Methyl ethyl ketone SP-13: Fluorine-based leveling agent

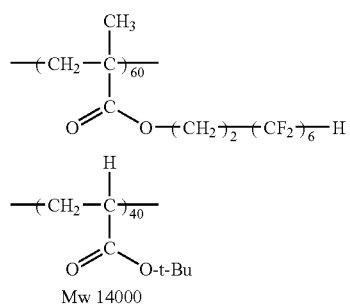

SP-13

Mw 14000

Manufacture of Antiglare Hard Coat Film:

Coating of Antiglare Hard Coat Layer:

A triacetyl cellulose film having a thickness of 80 μm (TAC-TD80U, a refractive index: 1.48, manufactured by Fuji Photo Film Co., Ltd.) is unwound from a roll. Each of the coating solutions for hard coat layer (HCL-11) to (HCL-14) is coated with a slot die coater as disclosed in JP-A-2003-211052, FIG. 1, in a dry film thickness shown in Table 5 below, and dried at 30° C. for 15 seconds and 90° C. for 20 seconds. The film is further irradiated with UV-ray under nitrogen purge at oxygen concentration of 100 ppm or less, with an air cooling metal halide lamp of 160 W/cm (manufactured by EYEGRAPHICS CO., LTD.), irradiation quantity of 70 mJ/cm$^2$ to manufacture hard coat films (HC-21) to (HC-26) each having a cured layer, and the films are rewound.

Coating of Low Refractive Index Layer:

On each of the hard coat layers of the hard coat films (HC-21) to (HC-26) manufactured above, low refractive index layer coating solution (LL-1) is coated by wet coating with a slot die coater as disclosed in JP-A-2003-211052, FIG. 1, in a dry film thickness of the low refractive index layer of 100 nm, and dried at 60° C. for 50 seconds. The film is further irradiated with UV-ray under nitrogen purge at oxygen concentration of 100 ppm or less, with an air cooling metal halide lamp of 240 W/cm (manufactured by EYEGRAPHICS CO., LTD.), and irradiation quantity of 400 mJ/cm$^2$ to form a low refractive index layer, and each film is rewound. Thus antireflective hard coat films of Sample Nos. 301 to 306 are obtained.

Evaluation of Antireflection Film:

These antireflective hard coat films are evaluated according to the following methods. The results obtained are shown in Table 5 below.

Incidentally (1) average reflectance, (2) pencil hardness, (3) curling, (4) a flexing property, and (5) thickness of hard coat layer are evaluated according to the above methods.

(6) Haze

[1] The whole haze value (H) of the obtained antiglare film is measured according to JIS-K7136.

[2] Several silicone oil droplets are dropped on the obverse and reverse of the antiglare film. The optical film is sandwiched between two sheets of glass plates (micro-slide glass, product No. S9111, manufactured by MATSUNAMI) having a thickness of 1 mm, and two glass plates and the obtained optical film are completely adhered, and haze is measured in a state of free of surface haze. The haze separately measured by sandwiching silicone oil alone between two sheets of glass plates is subtracted from the above haze, and the obtained value is taken as internal haze (Hi) of the film.

[3] The value obtained by subtracting the internal haze (Hi) computed in [2] from the whole haze (H) measured in [1] is calculated as surface haze (Hs).

TABLE 5

| Example No. | Sample No. | Hard Coat Layer Coating Solution | Thickness of Hard Coat Layer (μm) | Pencil Hardness | Curling | Flexing Property | Surface Haze (%) | internal Haze (%) | Average Reflectance (%) |
|---|---|---|---|---|---|---|---|---|---|
| Example 3-1 | 301 | HCL-11 | 2 | 4H | B | A | 4 | 20 | 1.3 |
| Example 3-2 | 302 | HCL-12 | 12 | 4H | A | A | 4 | 20 | 1.3 |
| Example 3-3 | 303 | HCL-12 | 20 | 5H | B | B | 4 | 33 | 1.3 |
| Example 3-4 | 304 | HCL-13 | 20 | 5H | A | A | 4 | 20 | 1.3 |
| Comparative Example 3-1 | 305 | HCL-14 | 12 | 4H | C | D | 4 | 20 | 1.3 |
| Comparative Example 3-2 | 306 | HCL-14 | 20 | 5H | D | D | 4 | 33 | 1.3 |

From the results shown in Table 5, the following matters are apparent.

In the antiglare hard coat film containing resin particles also, curling and a flexing property can be improved by containing polyrotaxane.

In particular, the hard coat film using ethylene oxide modified acrylate in a part of component (B) exhibits high surface hardness, and excellent curling suppressing effect and a flexing property.

Manufacture of Polarizing Plate and Liquid Crystal Display:

Examples 12-1 to 12-4

Polarizing plates with an antiglare antireflection film are manufactured as follows. A triacetyl cellulose film having a thickness of 80 μm (TAC-TD80U, manufactured by Fuji Photo Film Co., Ltd.) immersed in an NaOH aqueous solution of 1.5 mol/liter 55° C. for 2 minutes and then neutralized and washed with water is adhered on one side of a polarizer prepared by adsorbing iodine on polyvinyl alcohol and stretching, and sticking each of the antireflection films of Sample Nos. 301 to 304 of Examples 3-1 to 3-4 on the other side of the polarizer.

By using each of the polarizing plates prepared above, a liquid crystal display having the antiglare antireflection layer arranged on the outermost layer is manufactured. Each liquid crystal display shows low reflectance, mirroring of outer light is little, reflected images are inconspicuous, and visibility is high.

The invention can manufacture a hard coat film having high surface hardness and excellent in resistance to brittleness and curling prevention. The invention can also manufacture a polarizing plate and an image display having the hard coat film.

The entire disclosure of each and every foreign patent application from which the benefit of foreign priority has been claimed in the present application is incorporated herein by reference, as if fully set forth.

What is claimed is:

1. A polarizing plate comprising:
    a polarizer; and
    a hard coat film comprising, as a protective film of the polarizing plate, a transparent plastic film substrate having a thickness of from 10 to 200 μm, and a hard coat layer,
    wherein the hard coat layer is formed by drying and curing a composition for forming the hard coat layer, the composition containing the following component (A), component (B), and an organic solvent:
Component (A): a polyrotaxane,
Component (B): a monomer having two or more ethylenically unsaturated groups.

2. The polarizing plate as claimed in claim 1, wherein a cyclic molecule of the polyrotaxane of component (A) is a modified or unmodified cyclodextrin.

3. The polarizing plate as claimed in claim 2, wherein the cyclic molecule of the polyrotaxane of component (A) is a cyclodextrin in which a hydroxyl group thereof is modified with a hydrophobic modifying group, and the degree of the modification by the hydrophobic modifying group is 0.02 or more when taking the maximum number of hydroxyl groups of the cyclodextrin which can be modified as 1.

4. The polarizing plate as claimed in claim 1, wherein the polyrotaxane of component (A) is a polyrotaxane having an unsaturated double bond group.

5. The polarizing plate as claimed in claim 1, wherein a straight chain molecule of the polyrotaxane of component (A) has a polyethylene glycol chain.

6. The polarizing plate as claimed in claim 1, wherein at least a part of component (B) is a polyfunctional acrylate modified with ethylene oxide.

7. The polarizing plate as claimed in claim 1, further comprising:
    a second hard coat layer formed of a composition not containing polyrotaxane, the second hard coat layer being provided between the hard coat layer and the transparent plastic film.

8. The polarizing plate as claimed in claim 1, further comprising:
    a low refractive index layer, which is formed on the hard coat layer directly or via another layer.

9. An image display comprising:
    the polarizing plate claimed in claim 1.

10. The polarizing plate as claimed in claim 1, wherein the concentration of organic solvent in the hard coat layer after drying the composition is 5 mass % or less.

* * * * *